United States Patent
Mitsutani et al.

(10) Patent No.: US 6,200,021 B1
(45) Date of Patent: Mar. 13, 2001

(54) ABNORMALITY DETECTOR APPARATUS FOR A COOLANT APPARATUS FOR COOLING AN ENGINE

(75) Inventors: Noritake Mitsutani; Tomohiro Fujita, both of Toyota; Hideaki Mizuno, Owariasahi, all of (JP)

(73) Assignee: Toyota Jidosha Kabushiki Kaisha, Tokyo (JP)

(*) Notice: Subject to any disclaimer, the term of this patent is extended or adjusted under 35 U.S.C. 154(b) by 0 days.

(21) Appl. No.: 09/162,442

(22) Filed: Sep. 29, 1998

(30) Foreign Application Priority Data

| Nov. 10, 1997 | (JP) | ................................... | 9-307278 |
| Nov. 18, 1997 | (JP) | ................................... | 9-317104 |
| Dec. 5, 1997 | (JP) | ................................... | 9-335808 |

(51) Int. Cl.[7] .......................... G01K 15/00; G01K 13/00; G01K 13/02
(52) U.S. Cl. ............................... 374/1; 374/145
(58) Field of Search ............................ 374/1, 145

(56) References Cited

U.S. PATENT DOCUMENTS

| 1,159,918 | * | 11/1915 | Fowler, Jr. ........................... | 374/145 |
| 3,262,314 | * | 7/1966 | Gregg ................................ | 374/145 |
| 4,069,712 | * | 1/1978 | Armstrong et al. ................. | 73/118.1 |
| 4,393,365 | * | 7/1983 | Kondo et al. ........................ | 340/449 |
| 4,402,217 | * | 9/1983 | Higashiyama ...................... | 73/117.3 |
| 4,702,620 | * | 10/1987 | Ford .................................... | 374/145 |
| 5,153,835 | * | 10/1992 | Hashimoto et al. ................. | 701/114 |
| 5,186,148 | * | 2/1993 | Wataya ............................... | 123/479 |
| 5,526,871 | * | 6/1996 | Musser et al. ...................... | 165/11.1 |
| 5,614,664 | * | 3/1997 | Yamagishi ........................... | 73/118.1 |
| 5,656,771 | * | 8/1997 | Beswick et al. ..................... | 73/118.1 |
| 5,692,460 | * | 12/1997 | Froeschl et al. .................... | 123/41.1 |
| 5,803,603 | * | 9/1998 | Schlueter ............................ | 374/1 |
| 5,880,361 | * | 3/1999 | Taniguchi ........................... | 73/118.1 |

FOREIGN PATENT DOCUMENTS

| 3428344 | * | 9/1985 | (DE) | ......................................... | 374/1 |
| 0383249 | * | 8/1990 | (EP) | ..................................... | 374/145 |
| 0010825 | * | 1/1984 | (JP) | ..................................... | 374/145 |
| 0116630 | * | 6/1986 | (JP) | ......................................... | 374/1 |
| 6-213117 | | 8/1994 | (JP) | . | |
| 7-12217 | | 1/1995 | (JP) | . | |
| 11148420 | * | 6/1999 | (JP) | . | |

* cited by examiner

Primary Examiner—Diego Gutierrez
Assistant Examiner—Lydia De Jesus
(74) Attorney, Agent, or Firm—Oliff & Berridge, PLC

(57) ABSTRACT

An abnormality detector apparatus for an engine water-cooling apparatus has an electronic control unit (ECU) for precisely and quickly determining and detecting an operation abnormality of a thermostat or a water temperature sensor. After the engine is started, the ECU calculates, over time, an engine heat generation quantity, an estimated cooling water temperature or the like on the basis of various engine operating condition parameters, such as cooling water temperature, intake temperature, engine revolution speed, amount of intake air, and the like. After the elapse of a predetermined time, the ECU compares the estimated cooling water temperature and the cooling water temperature actually detected by the water temperature sensor. If the relationship therebetween meets a predetermined condition, the ECU determines whether there is an abnormality in the operating condition of the thermostat and/or the cooling water temperature sensor.

48 Claims, 23 Drawing Sheets

ABNORMALITY DETECTOR APPARATUS FOR A COOLANT APPARATUS FOR COOLING AN ENGINE

INCORPORATION BY REFERENCE

The disclosure of Japanese Patent Application Nos. 9-307278 filed on Nov. 10, 1997, 9-317104 filed on Nov. 18, 1997, and 9-335808 filed on Dec. 5, 1997 are incorporated herein by reference in their entirety.

BACKGROUND OF THE INVENTION

1. Field of Invention

The present invention relates to an abnormality detector apparatus for a water cooling type apparatus for cooling an engine. More particularly, the present invention relates to a thermostat abnormality detector apparatus for detecting an abnormality in a thermostat for opening and closing a portion of a cooling water circulation passage.

2. Description of Related Art

A "thermostat" herein refers to an open-close valve in a passage that is switched between the open and closed states at a specific critical temperature. Such a thermostat is used in a cooling water passage of a water cooling-type apparatus.

For example, water cooling-type apparatuses widely employed for automotive engines are designed so that a water pump circulates cooling water between a cooling water passage formed within the engine and a radiator. With this design, the cooling apparatus absorbs heat produced from the interior of the engine and then dissipates the heat from the radiator to the outside.

In order to maintain an appropriate engine temperature, the thermostat opens and closes the cooling water circulation passage. That is, when the cooling water temperature is lower than a predetermined value (normally, about 80° C.), as in the warm-up operation immediately after the engine is started, the thermostat valve closes. When the water temperature becomes higher than the predetermined value, the thermostat valve opens to allow cooling water to circulate between the engine interior and the radiator.

Normally, the thermostat valve closes when the cooling water is at a normal temperature. However, sometimes the thermostat valve may become unable to close from a fully open or semi-open state due to deterioration of a component, for example. If this happens, the engine becomes overcooled and the heater efficiency decreases. Moreover, the overcooling of the engine leads to constant performance of a so-called low-temperature fuel increase control wherein the amount of fuel injected is increased if the engine temperature is low, thereby resulting in deterioration of fuel economy, emissions and the like.

As a countermeasure against this problem, Japanese Patent Application Laid-Open No. 6-213117 (JP 6-213117), for example, proposes a heat insulating and pouring device of cooling water in an automobile wherein a detection device is provided for determining the occurrence of an abnormality in the thermostat if the water temperature detected by a water temperature sensor during a steady engine operation is out of a reference range. The JP 6-213117 application also discloses an arrangement wherein, if the cooling water temperature actually detected by the water temperature sensor at the elapse of a predetermined length of time following a start of the engine, is lower than a predetermined value, it is determined that there is an abnormality in the operation of the thermostat.

In a control device of an automatic transmission described in Japanese Patent Application Laid-Open No. 7-12217, the amount of change in the cooling water temperature for each predetermined length of time is calculated on the basis of a detection value provided by a water temperature sensor. An abnormality in a thermostat due to deterioration of a component or part thereof is detected on the basis of an abnormal change for example, a sluggish temperature change in the cooling water temperature.

However, the former arrangement performs abnormality determination based solely on water temperature and is not provided with any measure for discriminating states of the engine or various operating conditions. Therefore, the aforementioned conventional arrangement cannot achieve sufficiently high reliability in abnormality determination.

Although the latter arrangement calculates the amount of a subtle change in the cooling water temperature on the basis of a detection value provided by the water temperature sensor, the detection signal from the water temperature sensor is insufficient in terms of the following or tracing characteristic and precision for subtle temperature changes.

The manner of change in the cooling water temperature considerably varies during an initial period after a start of the engine, depending on the engine operating state, external environment conditions, and the like, leaving aside the operating state of the thermostat. Therefore, the latter arrangement incurs a significant possibility of false abnormality determination, thereby failing to achieve sufficiently high reliability in abnormality determination. For example, the arrangement may determine that there is an abnormality in the thermostat even through the thermostat is actually operating normally.

Additionally, if an abnormality in the thermostat is determined solely based on an abnormality represented by a change in the detection signal from the water temperature sensor, the arrangement may incorrectly determining that the thermostat has an abnormality when the water temperature sensor has a partial disconnection, contact failure and the like. In many cases in reality, the detection signal changes as if there were an abnormality in the thermostat. The aforementioned conventional art has another drawback that it is always necessary to wait for the elapse of a pre-set length of time before it can be confirmed that the operation of the thermostat is normal.

SUMMARY OF THE INVENTION

Accordingly, it is an object of the invention to provide an abnormality detector apparatus for a cooling apparatus and, more particularly, for a thermostat provided in the cooling system. The abnormality detector apparatus is capable of precisely and quickly determining the occurrence of an abnormality in the operation of the thermostat, or temperature sensor, provided in the cooling apparatus.

A first aspect of the invention provides an abnormality detector apparatus for a thermostat provided in a cooling water circulation passage of an engine. The abnormality detector apparatus includes a cooling water temperature detection device for detecting the cooling water temperature in the engine; a setting device for pre-setting a water temperature criterion and a condition where an abnormality appears in the cooling water temperature, after the engine is started; and a comparison device for comparing the cooling water temperature, detected by the cooling water temperature detection device, with the water temperature criterion if an operating condition of the engine becomes the condition where an abnormality appears in the cooling water temperature. If the cooling water temperature is lower than the water temperature criterion, the abnormality detector apparatus determines that the thermostat has an abnormality.

With the above construction, the abnormality detector apparatus is able to precisely detect an abnormality, if any, in the thermostat by suitably setting the condition and the water temperature criterion in accordance with the characteristics of the engine and the conditions of use thereof.

The abnormality detector apparatus described above may further include a determination device for determining that the operating condition of the engine has become the condition where an abnormality appears in the cooling water temperature if a predetermined operating condition parameter related to quantity of heat generated by the engine exceeds a predetermined reference value.

With this determination device, the abnormality detector apparatus determines the presence of a cooling effect on the basis of the quantity of heat generated by the engine. That is, the abnormality detector apparatus determines the quantity of heat added from the engine to the cooling water temperature, which is a main factor of increase in the cooling water temperature, and thereby determines the occurrence of an abnormality in the thermostat. Thus, the abnormality detector apparatus can perform highly reliable thermostat abnormality detection.

A second aspect of the invention provides an abnormality detector apparatus that includes a cooling water temperature detection device for detecting the cooling water temperature in the engine; an operating condition parameter detection device for detecting a predetermined operating condition parameter related to quantity of heat generated by the engine; and a determination device for, determining that the thermostat has an abnormality, if the cooling water temperature detected by the cooling water temperature detection device has not reached a pre-set water temperature criterion when the operating condition parameter detected by the operating condition parameter detection device reaches a predetermined reference value after the engine is started.

The abnormality detector apparatus according to the second aspect of the invention determines the presence of a cooling effect on the basis of the quantity of heat generated by the engine, i.e., the quantity of heat added from the engine to the cooling water temperature, which is a main factor of increase in the cooling water temperature. The abnormality detector apparatus thereby determines the occurrence of an abnormality in the thermostat. Thus, the abnormality detector apparatus can perform highly reliable thermostat abnormality detection. Furthermore, since the prediction of change in the heat generation quantity and the accumulating calculation of the heat generation quantity can easily and quickly be performed, the precision in the abnormality detection is improved.

The operating condition parameter may include an accumulated amount of air taken in after the engine is started. The intake air amount is closely related to the heat generation by the engine, that is, the explosion and combustion. In this case, the intake air amount is used in the calculation of a heat generation quantity so that the reliability in the abnormality detection is further improved.

A third aspect of the invention provides an abnormality detector apparatus that includes a cooling water temperature detection device for detecting the cooling water temperature in the engine; an abnormality determination device for determining that there is an abnormality in operation of the thermostat, if the cooling water temperature detected by the cooling water temperature detection device is lower than a predetermined reference water temperature after elapse of a predetermined time following a start of the engine; a normality determination device for, determining that the operation of thermostat is normal, if the detected cooling water temperature is equal to or higher than a predetermined reference water temperature after elapse of a predetermined time following the start of the engine; a first cooling water temperature estimating device for estimating a cooling water temperature under a condition where abnormal operation of the thermostat is assumed; a second cooling water temperature estimating device for estimating a cooling water temperature under a condition where normal operation of the thermostat is assumed; a normality determination permitting device for permitting the normality determination device to operate, if the cooling water temperature estimated by the first cooling water temperature estimating device is lower than a predetermined water temperature; and an abnormality determination permitting device for permitting the abnormality determination device to operate if the cooling water temperature estimated by the second cooling water temperature estimating device is equal to or higher than a predetermined water temperature.

The above described abnormality detector apparatus according to the third aspect of the invention calculates two different estimated cooling water temperatures on the basis of the engine operating conditions and the like, under the condition where normal operation of the thermostat is assumed and under the condition where abnormal operation thereof is assumed, respectively. Then, the apparatus compares each of the estimated cooling water temperatures with a predetermined reference temperature, so as to limit the conditions for permitting the abnormality determination device or the normality determination device to operate. Therefore, the reliability in the abnormality or normality determination regarding the thermostat can be improved. Furthermore, if the thermostat is normal under an environment condition or an engine operating condition where the engine temperature increases relatively fast, the normality of the thermostat will be promptly confirmed.

A fourth aspect of the invention provides a cooling apparatus abnormality detector apparatus for a cooling apparatus having a thermostat provided in a cooling water circulation passage of an engine, and a cooling water temperature detection device for detecting the cooling water temperature in the engine. The cooling apparatus abnormality detector apparatus includes an abnormality detection device for detecting an abnormality in the cooling apparatus on the basis of a change in the cooling water temperature after the engine is started, and a determination device for determining which one of the thermostat and the cooling water temperature detection device has an abnormality, on the basis of a change in the cooling water temperature occurring after the abnormality is detected in the cooling apparatus.

Thus, the cooling apparatus abnormality detector apparatus is able to quickly and precisely detect an abnormality in the cooling apparatus and is able to precisely determine which one of the cooling water temperature control function and the cooling water temperature detecting function has an abnormality.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

First to third embodiments wherein the thermostat abnormality detector apparatus of the invention is applied to an automotive engine cooling system 2 will first be described with reference to FIGS. 1 through 16.

Figure 1:
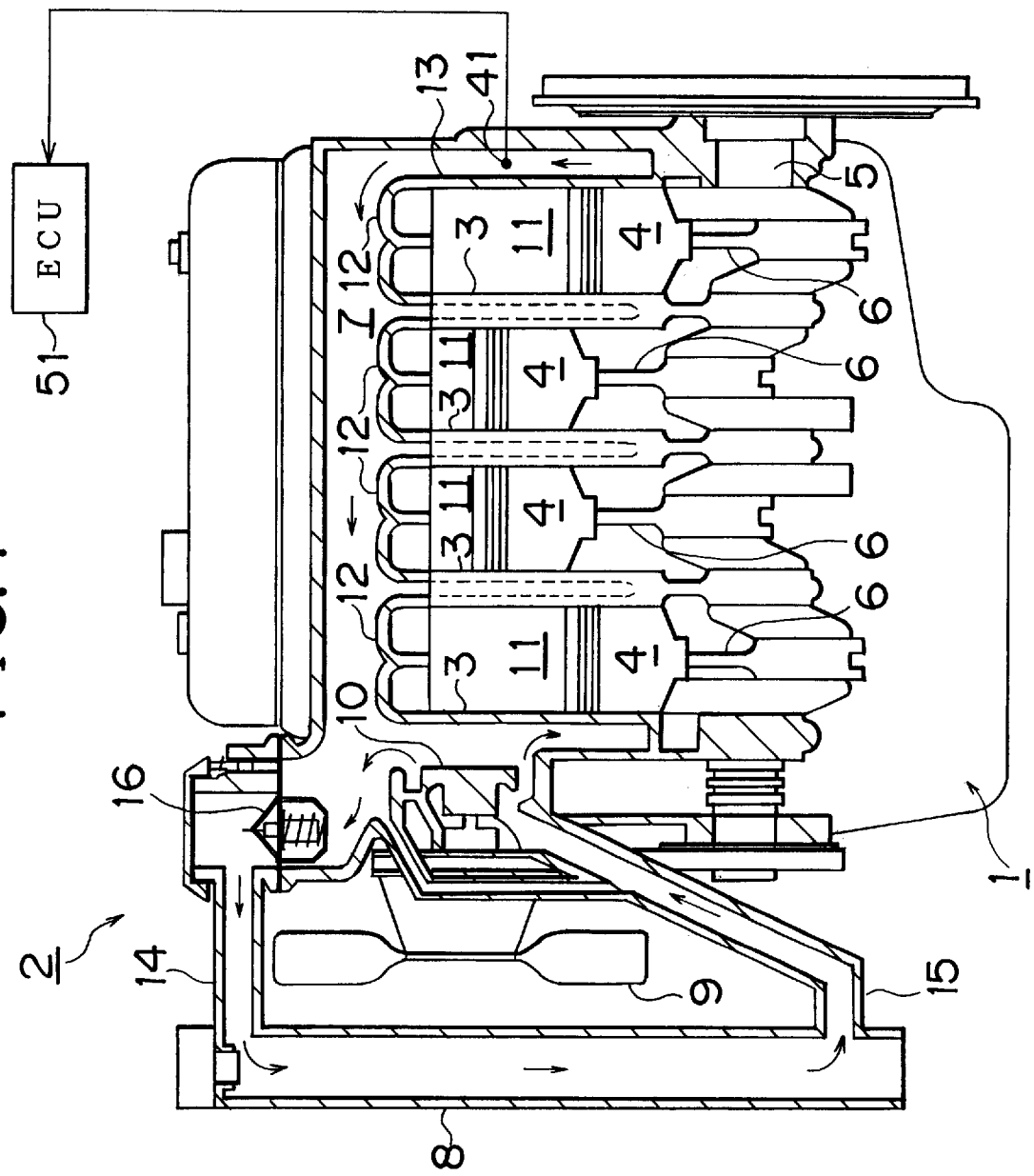
FIG. 1 is a schematic illustration of an engine cooling system to which a thermostat abnormality detector apparatus according to the invention is applied.

Referring to FIG. 1, a four-cylinder engine 1 has four cylinders 3, four pistons 4, a crankshaft 5, connecting rods 6 connecting the corresponding pistons 4 to the crankshaft 5, a water jacket 7 surrounding the cylinders 3, a radiator 8 disposed outside the body of the engine 1, a cooling fan 9, a water pump 10, and the like. The interior of the radiator 8 is in connection with the water jacket 7.

Each piston 4 is moved up and down by explosion and combustion of an air-fuel mixture within the combustion chamber defined by the piston 4 and the corresponding cylinder 3. The reciprocal movements of the pistons 4 are converted into rotational driving force of the crankshaft 5 by the connecting rods 6. Air-fuel mixture is supplied through intake ports (not shown), and combustion gas is discharged through exhaust ports (not shown). The waterjacket 7, provides a circulation space of cooling water which surrounds the outer peripheries of the cylinders 3 in order to cool the cylinder head 12, the cylinder block 13 and the like, that are heated by combustion of the air-fuel mixture or to maintain constant temperatures thereof when necessary.

The cooling water circulating passage within the water jacket 7 is connected with the radiator 8 by upper and lower connecting passages 14, 15. A thermostat 16 is provided in partway of the upper connecting passage 14. The thermostat 16 is a valve that is mechanically opened and closed in accordance with the water temperature. In the first embodiment, the thermostat 16 is closed so as to close the upper connecting passage 14, when the water temperature is equal to or less than 82° C. If the water temperature exceeds 82° C., the thermostat 16 becomes open to open the upper connecting passage 14.

A water temperature sensor 41 is disposed in an inner wall of the water jacket 7. The water temperature sensor 41 detects the temperature THW of cooling water, and sends a detection signal to an electronic control unit (ECU) 51. The ECU 51 controls and diagnoses various components of the engine 1, including thermostat 16, on the basis of the operating conditions of the engine 1. The ECU 51 will be described in detail below.

Figure 2:
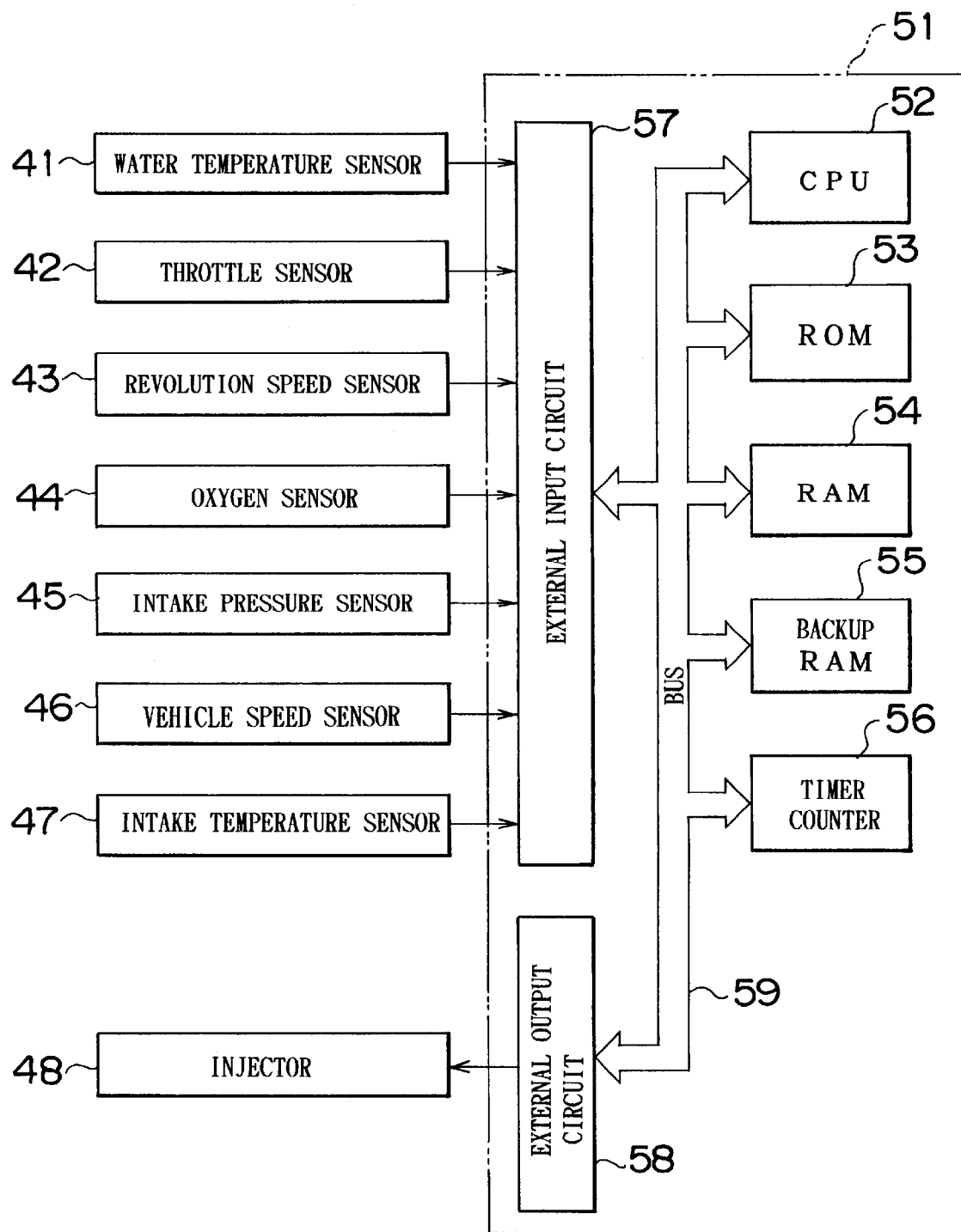
FIG. 2 is a block diagram illustrating an electrical arrangement of the electronic control unit of FIG. 1.

Referring to the block diagram of FIG. 2, the ECU 51 has a central processing unit (CPU) 52, a read-only memory (ROM) 53, a random access memory (RAM) 54, a backup RAM 55, and a timer counter 56. The ECU 51 forms a logic operation circuit wherein the various components of the ECU 51 are connected to an external input circuit 57 and an external output circuit 58 by bus 59. The ROM 53 stores pre-set programs related to various operation controls, diagnostics and the like. The RAM 54 temporarily stores results of operations by the CPU 52, and the like. The backup RAM 55 is a non-volatile memory that retains data even after the engine 1 is stopped. The timer counter 56 is able to simultaneously perform different time counting operations. The external input circuit 57 includes a buffer, a waveform circuit, a hard filter (a circuit formed by an electric resistor and a capacitor), an A/D converter, drive circuits and the like.

The water temperature sensor 41 detects the cooling water temperature THW within the water jacket 7 as mentioned above. A throttle sensor 42 detects throttle valve opening TA in accordance with the amount of depression of an accelerator pedal (not shown). A revolution speed sensor 43 detects the revolution speed of the crankshaft 5, that is, engine revolution speed NE. An oxygen sensor 44 detects oxygen concentration in exhaust gas. An intake pressure sensor 45 detects intake pressure PM. A vehicle speed sensor 46 detects vehicle speed SPD. An intake temperature sensor 47 detects the temperature (intake temperature) THA of intake air introduced into an air cleaner. These sensors 41–47 are connected to the external input circuit 57. The CPU 52 reads in, as input values, detection signals inputted from the sensors 41–47 via the external input circuit 57. Based on the input values, the CPU 52 executes various operation controls, diagnostics, and the like, for example, controls of fuel injection amount and fuel injection timing using a fuel injector 48. Among the various controls executed by the ECU 51, the content of a control related to the detection of an abnormality in the thermostat 16 will be described below.

Figure 3:
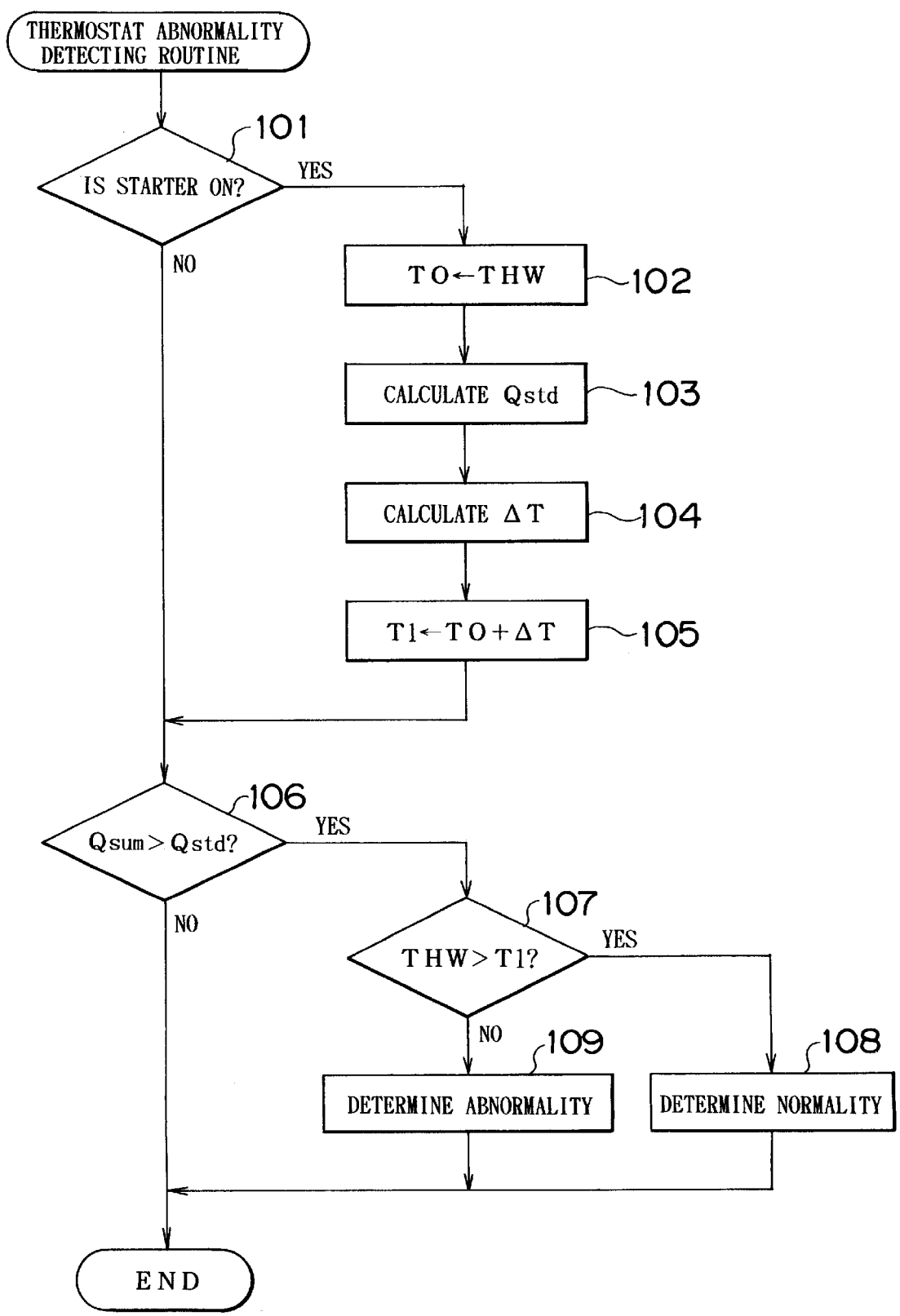
FIG. 3 is a flowchart illustrating a thermostat abnormality detecting procedure according to a first embodiment.

FIG. 3 illustrates a thermostat abnormality detecting routine in the thermostat abnormality detection control according to the first embodiment. The program related to this routine is pre-stored in the ROM 53 of the ECU 51. When the main electric power source of the motor vehicle is turned on, the routine is executed every predetermined period of time.

When the thermostat abnormality detecting routine is started, the ECU 51 determines in step 101 whether an engine starting operation is performed, on the basis of an electric signal from a starter switch (not shown). If it is determined that the engine starting operation is performed, operation proceeds to step 102. If the engine starting operation is not performed, operation proceeds to step 106. The determination in step 101 is executed in order to set an engine-start cooling water temperature T0, a critical water temperature T1 and the like (described later) as initial values in the subsequent steps. Therefore, in step 101, the affirmative determination is made immediately after the engine starting operation, and the negative determination is made in the next and later cycles of this routine.

In step 102, the ECU 51 reads in a present cooling water temperature THW calculated on the basis of a detection value from the water temperature sensor 41, and sets the cooling water temperature THW as a cooling water temperature initial value (engine-start cooling water temperature) T0. Operation then proceeds to step 103.

Figure 4:
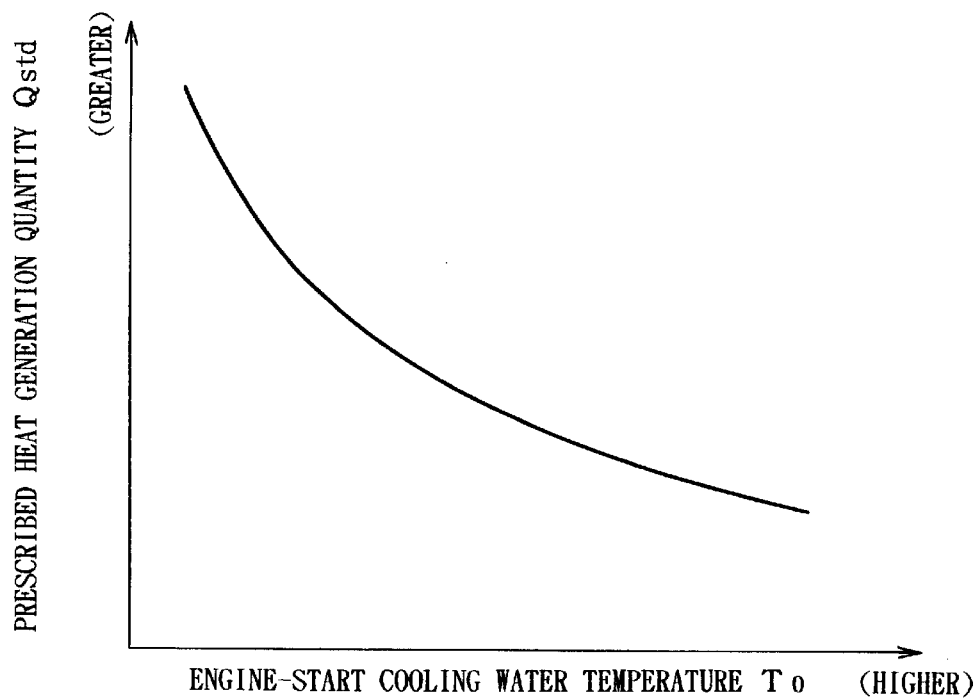
FIG. 4 is a graph indicating the relationship between the prescribed heat generation quantity Qstd and the engine-start water temperature T0.

In step 103, the CPU 52 calculates a prescribed heat generation quantity Qstd (described later in conjunction with step 106), as a prescribed quantity of engine operating condition for determining whether to perform the abnormality determination regarding the thermostat 16. The prescribed heat generation quantity Qstd is determined on the basis of the engine-start cooling water temperature T0 stored in step 102, with reference to a map (not shown). In the map, the prescribed heat generation quantity Qstd and the engine-start cooling water temperature T0 have a relationship as indicated in FIG. 4. That is, the prescribed heat generation quantity Qstd decreases as the engine-start cooling water temperature T0 increases. This relationship is based on the fact that if the initial temperature is high, the cooling water temperature can easily be increased to a predetermined temperature by supplying a reduced amount of heat.

Subsequently in step 104, the ECU 51 calculates an estimated temperature increase ΔT on the basis of the cooling water temperature initial value T0, with reference to a map. The estimated temperature increase ΔT is an estimated amount of increase in the cooling water temperature caused when a predetermined amount of heat is generated from the engine 1. The relationship between the estimated temperature increase ΔT and the engine-start cooling water temperature T0 is similar to that between the prescribed heat generation quantity Qstd and the engine-start cooling water temperature T0 indicated in FIG. 4. After calculating the estimated temperature increase ΔT, the ECU 51 proceeds to step 105.

In step 105, the ECU 51 adds the estimated temperature increase ΔT calculated in step 104 to the cooling water temperature initial value T0 calculated in step 102, and temporarily stores the sum as the water temperature criterion T1. Then, operation proceeds to step 106. Thus, the process of steps 102–105 determines the water temperature criterion Ti suitable for abnormality determination with respect to the thermostat 16, from the engine-start cooling water temperature T0.

In step 106, the ECU 51 reads in the latest value of estimated heat generation quantity Qsum that is updated at every performance of fuel injection in an injection timing routine described later, and determines whether the estimated heat generation quantity Qsum exceeds the pre-set prescribed heat generation quantity Qstd. If the estimated heat generation quantity Qsum exceeds the prescribed heat generation quantity Qstd, the ECU 51 proceeds to step 107. If the estimated heat generation quantity Qsum is equal to or less than the prescribed heat generation quantity Qstd, the ECU 51 temporarily ends the routine.

In step 107, the ECU 51 reads in a present cooling water temperature THW calculated from a detection value from the water temperature sensor 41, and determines whether the present cooling water temperature THW exceeds the water temperature criterion T1. If the determination is affirmative, the ECU 51 proceeds to step 108 where the ECU 51 determines that the thermostat 16 is normal. The ECU 51 then temporarily ends this routine. Conversely, if the determination in step 107 is negative, the ECU 51 proceeds to step 109, where the ECU 51 determines that the thermostat 16 is abnormal, and produces an alarm to the operator of the vehicle, for example, by turning on a malfunction indicator light and the like. The ECU 51 then temporarily ends the routine.

Figure 5:
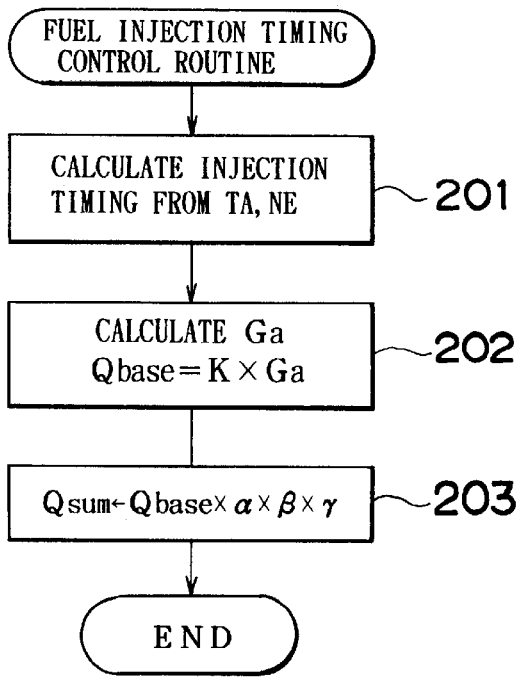
FIG. 5 is a flowchart illustrating a fuel injection timing control procedure according to the first embodiment.

FIG. 5 illustrates a fuel injection timing control routine for determining a fuel injection timing of the injector 48, and calculating the estimated heat generation quantity Qsum. When the engine 1 is started, the fuel injection timing control routine is executed at every series of engine operating strokes (intake, compression, expansion and exhaustion), in order to control the fuel injection timing in the next series of engine operation strokes. In this routine, the ECU 51, in step 201, determines a fuel injection timing on the basis of various operating condition parameters such as the throttle valve opening TA, the engine revolution speed NE and the like. The ECU 51 then proceeds to step 202.

In step 202, the ECU 51 calculates an amount of intake air Ga drawn into the combustion chamber of the present fuel injection, on the basis of the detection signal (intake pressure) PM from the intake pressure sensor 45. Furthermore, the ECU 51 calculates a basic estimated heat generation quantity Qbase, that is, an estimate of the quantity of heat generated from the engine 4, on the basis of the intake air amount Ga. Since the total quantity of heat generated from the engine 1 by the explosion and combustion of fuel is estimated to be proportional to the intake air amount, the basic estimated heat generation quantity Qbase is calculated by multiplying the intake air amount Ga by a pre-set coefficient K as in equation (1).

$$Qbase = K \times Ga \quad (1)$$

After calculating the basic estimated heat generation quantity Qbase, the ECU 51 proceeds to step 203. In step 203, the ECU 51 calculates an air-fuel ratio A/F, a vehicle speed SPD and an intake temperature THA based on the detection signals from the intake pressure sensor 45, the vehicle speed sensor 46 and the intake temperature sensor 47. Furthermore, in step 203, the ECU 51 calculates correction factors that affect the heat generation by the explosion/combustion, that is, a correction coefficient α (see FIG. 6) based on the air-fuel ratio A/F, a correction coefficient β (see FIG. 7) based on the vehicle speed (vehicle speed air flow) SPD, and a correction coefficient γ (see FIG. 8) based on the intake temperature THA (external air temperature).

The correction coefficients α, β, γ are used as coefficients to multiply the basic estimated heat generation quantity Qbase in order to determine estimated heat generation quantity Qsum. The correction coefficients α, β, γ are determined on the basis of the detection values from the sensors 45–47, with reference to pre-set maps or the like.

Figure 6:
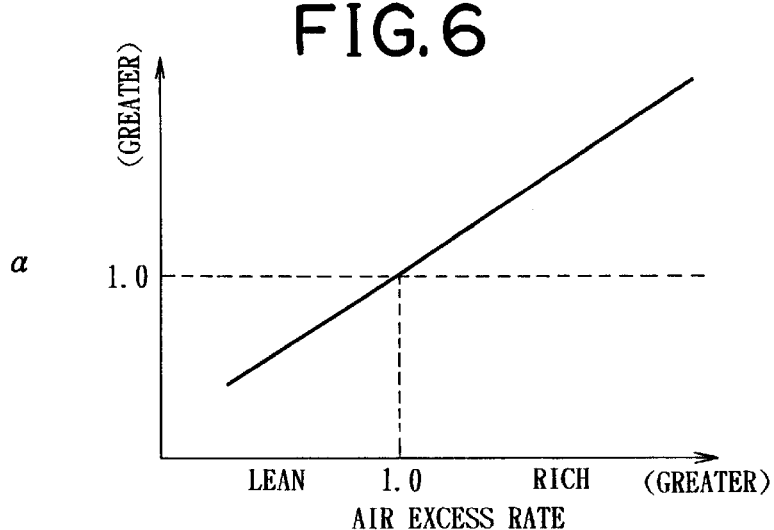
FIG. 6 is a graph indicating the relationship between the air excess rate and a correction coefficient α related to the calculation of an estimated quantity of heat generated by the engine.
Figure 7:
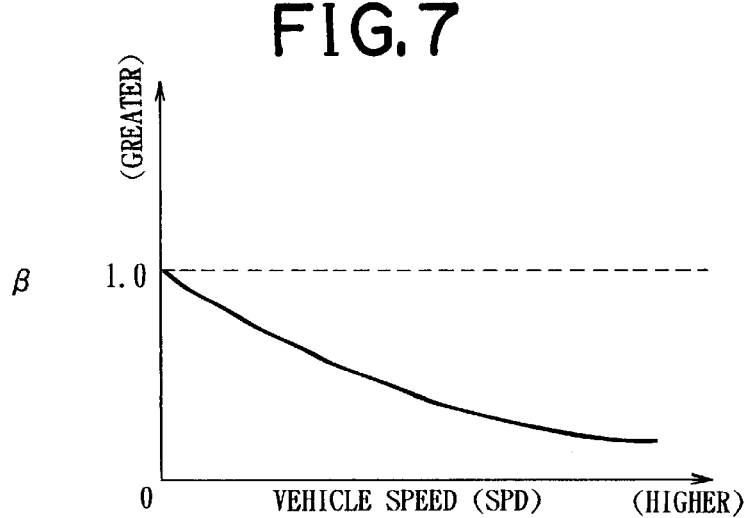
FIG. 7 is a graph indicating the relationship between the vehicle speed air flow and a correction coefficient β related to the calculation of the estimated quantity of heat generated by the engine.
Figure 8:
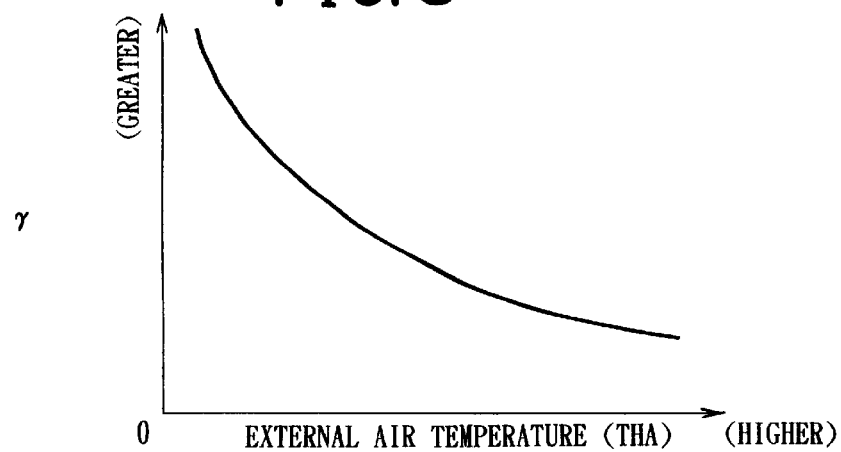
FIG. 8 is a graph indicating the relationship between the intake temperature and a correction coefficient γ related to the calculation of the estimated quantity of heat generated by the engine.

As indicated in FIG. 6, the correction coefficient α linearly increases with increases in the air excess rate λ (λ=actual air-fuel ratio/theoretical air-fuel ratio). That is, as the air-fuel ratio increases, the combustion temperature tends to increase. As indicated in FIG. 7, the correction coefficient β decreases with increases in the vehicle speed (vehicle speed air flow). That is, as the vehicle speed increases, the amount of heat radiation to the outside also increases. As indicated in FIG. 8, the correction coefficient γ decreases with increases in the intake temperature (external air temperature) THA.

The basic estimated heat generation quantity Qbase is multiplied by the correction coefficients α, β, γ to obtain the estimated heat generation quantity Qsum.

In another possible process, the accumulation of the estimated heat generation quantities Qsum from the estimated heat generation quantity Qsum at the time of a start of the engine to the estimated heat generation quantity Qsum calculated in the previous cycle of the routine is temporarily stored as an estimated total heat generation quantity Qsum (n−1) in the RAM 54. The presently calculated estimated heat generation quantity Qsum is added thereto to obtain the latest estimated total heat generation quantity Qsum(n).

Through the thermostat abnormality detecting routine and the fuel injection timing control routine, the ECU 51 detects an operation failure in the thermostat 16, that is, an operation failure wherein the thermostat valve 16 is at the fully open or semi-open state and fails to operate. As is apparent from the description of the two routines, the ECU 51 first determines the water temperature criterion T1 and the prescribed heat generation quantity Qstd in accordance with the cooling water temperature at the time of a start of the engine 1. The water temperature criterion T1 is a temperature value that is slightly lower than the upper limit temperature of a range where the thermostat 16, when normal, maintains the open state of the cooling water passage. The prescribed heat generation quantity Qstd corresponds to the quantity of heat that is necessary and sufficient to achieve the water temperature criterion T1 in a case where the engine-radiator circulation is not performed.

Therefore, when the quantity of heat generation from the engine 1 estimated from the amount of intake air supplied for combustion in the engine 1 and the like reaches the prescribed heat generation quantity Qstd, the abnormality determination in the thermostat 16 is performed. That is, if the water temperature actually detected by the water temperature sensor 41 is higher than the water temperature criterion T1, it is considered that the cooling water passage was maintained in the closed state until the cooling water temperature reached a predetermined temperature, so that it is determined that the thermostat 16 is normal. Conversely, if the actually detected cooling water temperature is equal to or lower than the water temperature criterion T1, it is considered that the cooling water passage was open although the cooling water temperature did not reach the predetermined temperature, so that it is determined that there is an abnormality in the thermostat 16.

Figure 9:
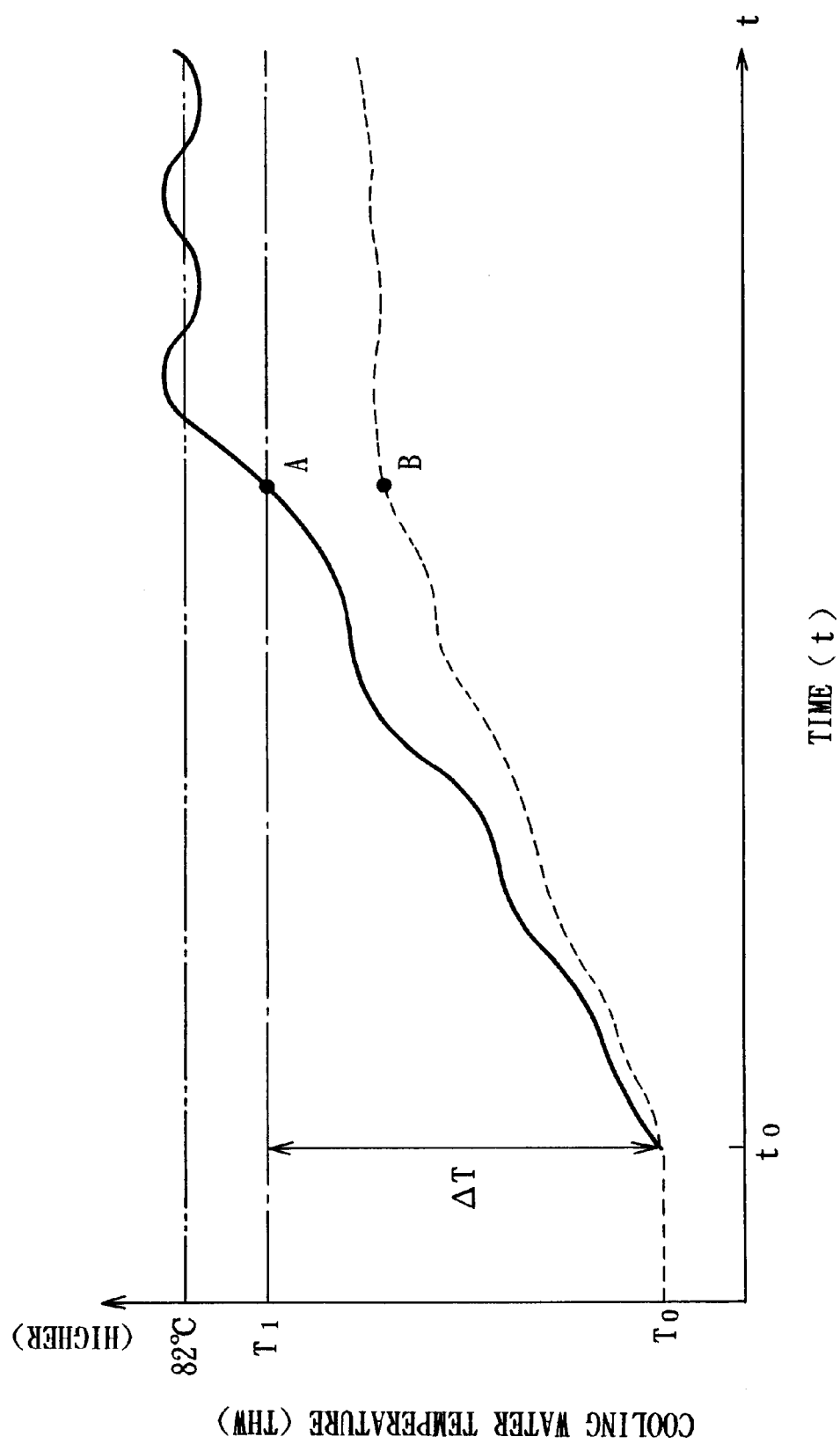
FIG. 9 is a time chart indicating the manner of detecting an abnormality in the thermostat according to the first embodiment.

For example, FIG. 9 shows the comparison in the time-dependent change in the cooling water temperature within the water jacket after the engine 1 is started in an engine cooling system provided with a thermostat abnormality detector apparatus according to the embodiment in a case where the thermostat 16 is normal and a case where the thermostat 16 is in an open state and fails to operate. In the graph of FIG. 9, the abscissa axis indicates time t, and the coordinate axis indicates the cooling water temperature THW.

Normally, the cooling water temperature THW gradually increases after time point t0 (start of the engine 1), due to heat from the engine 1. In a cooling system in which the thermostat 16 is provided in the cooling passage, the cooling passage is closed to reduce the engine cooling effect of cooling water until the cooling water temperature reaches the predetermined temperature (for example, 82° C.), if the thermostat 16 is normal.

When the cooling water temperature exceeds the predetermined temperature, the cooling passage is opened to circulate cooling water between the radiator 8 and the waterjacket 7 of the engine 1, thereby actively dissipating heat. The cooling water temperature is thereby decreased. When the cooling water temperature decreases below the predetermined temperature due to the cooling effect described above, the thermostat 16 closes the cooling water passage to curb the cooling effect. In this manner, the cooling water temperature is normally stabilized around the predetermined temperature (82° C.) (as indicated by a solid-line curve in FIG. 9).

However, if the thermostat 16 becomes unable to operate because it remains in a fully open or semi-open state, an overcooled state of the engine 1 occurs wherein cooling water is allowed to circulate between the radiator 8 and the water jacket 7 even in a warm-up operation immediately after the engine 1 is started. Thus, the cooling water temperature does not easily increase to a suitable temperature. Whether the actual cooling water temperature detected by the water temperature sensor 41 has increased to the water temperature criterion T1 is determined at a time point (time point A in FIG. 9) at which the engine 1 is considered to generate a quantity of heat estimated to be necessary and sufficient for the cooling water temperature to reach the water temperature criterion T1 while the thermostat 16 is in the closed state, using the water temperature criterion T1 as a reference for the consideration. The water temperature criterion T1 is set, considering the cooling water temperature at the time of the start of the engine, to a value that is slightly lower than the predetermined temperature (82° C.) at which the thermostat 16 is switched between the open and closed states. If the thermostat 16 has an abnormality, the cooling water temperature THW is equal to or lower than the water temperature criterion T1 as indicated by point B in FIG. 19.

In a conventional thermostat abnormality detector apparatus, it is determined whether there is an abnormality in the thermostat 16 on the basis of the manner of change in the cooling water temperature detected by a water temperature sensor or the like, when the thermostat 16 is in an opening or closing state (a transitional state between the open and closed states). However, since the water temperature changes subtly and delicately during a normal engine operation, it is difficult or impossible for the temperature sensor to have such high following characteristic and precision as to detect an abnormal manner of change in the water temperature caused by an abnormality when the thermostat 16 becomes abnormal.

In contrast, in the abnormality detector apparatus for the thermostat 16 of this embodiment, a range where a remarkable abnormality in the cooling water temperature appears when the thermostat 16 has an abnormality is pre-set as an accumulation of the quantity of heat generated by the engine 1 over time. When the operating state of the engine 1 reaches the range, the detector apparatus determines whether the thermostat 16 has an abnormality, by comparing the actually detected cooling water temperature with a pre-set water temperature criterion T1. Therefore, the thermostat abnormality detector apparatus of this embodiment is able to perform abnormality determination precisely corresponding to the manner of change in the cooling water temperature that varies in accordance with the characteristics or operating conditions of the engine 1.

Furthermore, the water temperature criterion T1 is appropriately set on the basis of the engine-start cooling water temperature T0. For example, an optimal value of the water temperature criterion T1 can be selected from a map prepared with regard to the engine-start cooling water temperature T0 and the cooling water temperature THW that occurs at the elapse of a predetermined length of time following the start of the engine 1, thereby further improving the reliability in abnormality determination.

In addition, the water temperature criterion T1 is set to a value that is slightly lower than the boundary temperature (82° C.) for the opening and closing operation of the thermostat 16. Therefore, even in a case where the thermostat 16 is normal but the warm-up of the engine 1 is delayed, for example, due to an external environmental condition or the like, the thermostat abnormality detector apparatus of this embodiment suitably avoids incorrectly determining that the thermostat 16 has an abnormality. Moreover, an estimated quantity of engine heat generation is calculated by using the intake air amount Ga as a basic parameter and also various parameters related to the heat balance of the engine 1, such as the air excess rate $\lambda$, the vehicle speed SPD and the like. Therefore, the accuracy of this estimated value is improved.

With this design, the thermostat abnormality detector apparatus of this embodiment is able to promptly and precisely perform abnormality determination in the thermostat 16 and, based on the result of the prompt and precise abnormality determination, makes it possible to appropriately produce an alarm and take a countermeasure. Therefore, the abnormality detector apparatus is able to suitably prevent or control the unnecessary continuation of a low-temperature increase state of fuel injection due to the overcooling of the engine system during a warm-up operation.

Since the abnormality detector apparatus of the embodiment detects an abnormality in the thermostat 16 in the manner as described above, the thermostat abnormality detector apparatus is able to perform abnormality determination precisely corresponding to the manner of change in the cooling water temperature that varies depending on the characteristics of the engine 1 or the time-varying engine operating conditions.

The abnormality detector apparatus of the embodiment makes it possible to select an optimal value of the water temperature criterion T1 for abnormality determination, thereby improving the reliability in abnormality determination. The apparatus of the embodiment also avoids making a incorrect determination in a case where the thermostat 16 is normal.

Furthermore, the apparatus of the embodiment uses a plurality of parameters related to the heat balance in the engine 1, such as the intake air amount Ga and the like to estimate an accurate accumulation of the quantity Q of engine heat generation. Therefore, the apparatus is able to obtain accurate information related to the manner of change in the cooling water temperature and, therefore, perform highly reliable abnormality determination regarding the thermostat 16.

A second embodiment of the invention will now be described, mainly focusing on the features that distinguish the second embodiment from the first embodiment. The control programs of a thermostat abnormality detector apparatus according to the second embodiment also include a thermostat abnormality detecting routine and a fuel injection timing control routine.

Figure 10:
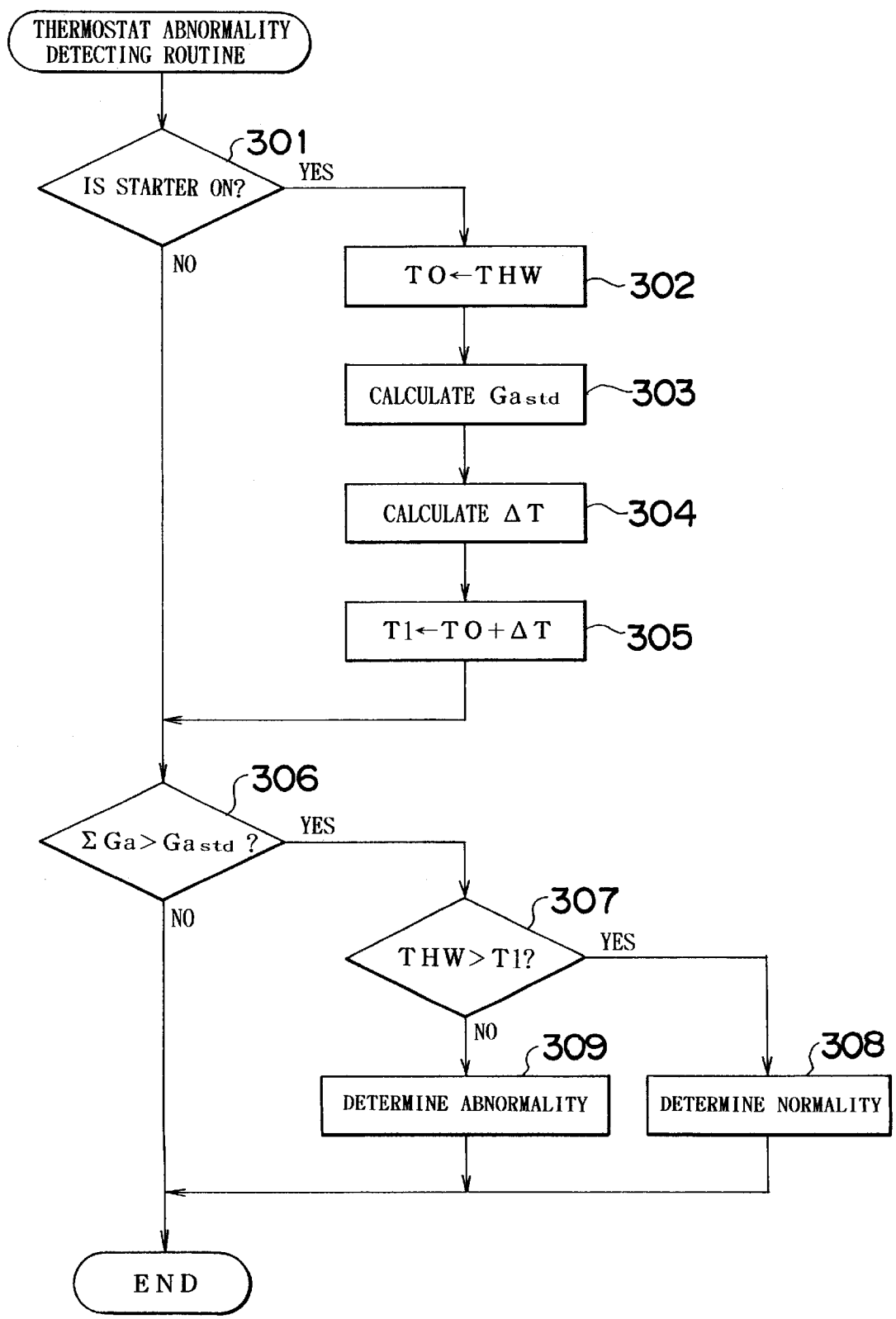
FIG. 10 is a flowchart illustrating a thermostat abnormality detecting procedure according to a second embodiment.

FIG. 10 illustrates the thermostat abnormality detecting routine in the thermostat abnormality detection control in the second embodiment. The program related to this routine is also pre-stored in the ROM 53 of the ECU 51. When the main electric power source of the motor vehicle is turned on, the routine is executed every predetermined period of time.

In the thermostat abnormality detecting routine, the process of steps 301 through 305 correspond to the process of steps 101 through 105 in the thermostat abnormality detecting routine of the first embodiment. However, in step 303 in the second embodiment, the ECU 51 sets a prescribed intake air amount Gastd as a prescribed quantity of engine operating condition for determining whether to perform abnormality determination regarding the thermostat 16. The prescribed intake air amount Gastd is determined on the basis of an engine-start cooling water temperature T0, with reference to a map (not shown), as in the case of the prescribed heat generation quantity Qstd in the first embodiment. The manner of change in the prescribed intake air amount Gastd is substantially the same as the manner of change in the prescribed heat generation quantity Qstd corresponding to the engine-start cooling water temperature T0 as indicated in FIG. 4.

In step 306, the ECU 51 reads in the latest value of total intake air amount $\Sigma Ga$ that is calculated in the fuel injection timing routine described later and that is updated every performance of fuel injection into the cylinders. Then the ECU 51 determines whether the total intake air amount $\Sigma Ga$ exceeds the pre-set prescribed intake air amount Gastd. If the total intake air amount $\Sigma Ga$ is greater than the prescribed intake air amount Gastd, the ECU 51 proceeds to step 307. If the total intake air amount $\Sigma Ga$ is equal to or less than the prescribed intake air amount Gastd, the ECU 51 temporarily ends this routine.

In step 307, the ECU 51 reads in a present cooling water temperature THW calculated on the basis of a detection value from the water temperature sensor 41, and then determines whether the cooling water temperature THW exceeds the water temperature criterion T1. If the determination is affirmative, operation proceeds to step 308 where the ECU 51 determines that the thermostat 16 is normal. Then, the ECU 51 temporarily ends this routine. Conversely, if the determination in step 307 is negative, operation proceeds to step 309 where the ECU 51 determines that the thermostat 16 has an abnormality, and produces an alarm to the vehicle operator by, for example, turning on a malfunction indicator light or the like. Then, the ECU 51 temporarily ends this routine.

Figure 11:
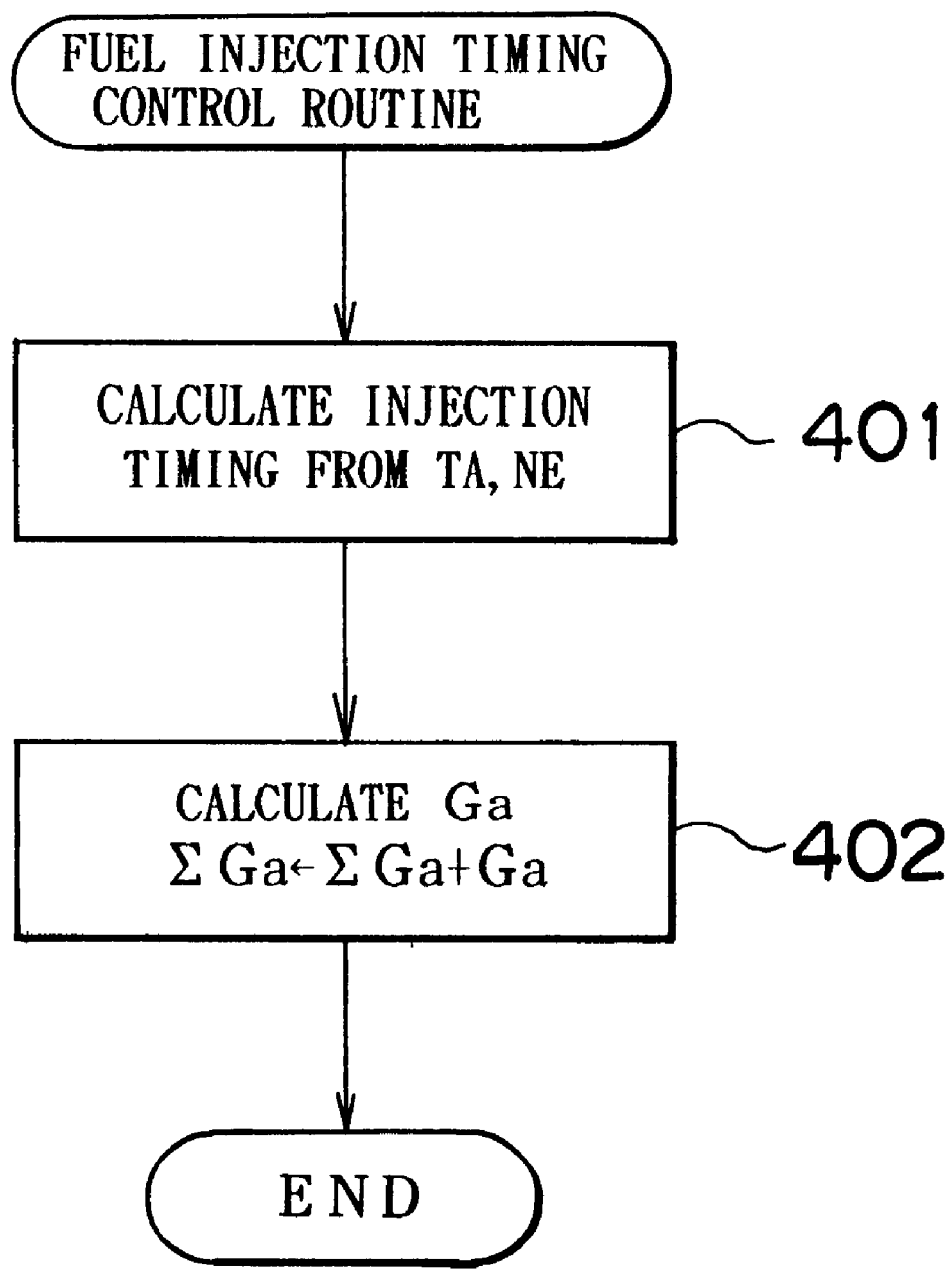
FIG. 11 is a flowchart illustrating a fuel injection timing control procedure according to the second embodiment.

FIG. 11 illustrates the fuel injection timing control routine that determines a fuel injection timing of the injector 48 and calculates the total intake air amount ΣGa.

As in the corresponding routine of the first embodiment, when the engine 1 is started, the fuel injection timing control routine of the second embodiment is executed at every series of engine operating strokes (intake, compression, expansion and exhaustion), in order to control the fuel injection timing in the next series of engine operation strokes. In this routine, the ECU 51 determines in step 401 a fuel injection timing on the basis of various operating condition parameters such as the throttle valve opening TA, the engine revolution speed NE and the like. The ECU 51 then proceeds to step 402.

In step 402, the ECU 51 calculates an amount of intake air Ga drawn into the combustion chamber of the present fuel injection, based on the detection signal (intake pressure) PM from the intake pressure sensor 45. Then, the accumulated intake air amount ΣGa(n) up to the present intake air amount Ga is calculated by adding the presently detected intake air amount Ga(n) to the accumulated intake air amount ΣGa(n−1) from the intake air amount Ga immediately after a start of the engine to the previous intake air amount Ga(n−1).

The accumulated intake air amount ΣGa is a value obtained by accumulating the intake air amount Ga per unit time immediately after the start of the engine 1 over time (every time combustion is performed in a combustion chamber in the engine 1). The relationship between the intake air amount Ga and time, and between the accumulated intake air amount ΣGa and time, is indicated as an example in the graph of FIG. 12.

Figure 12:
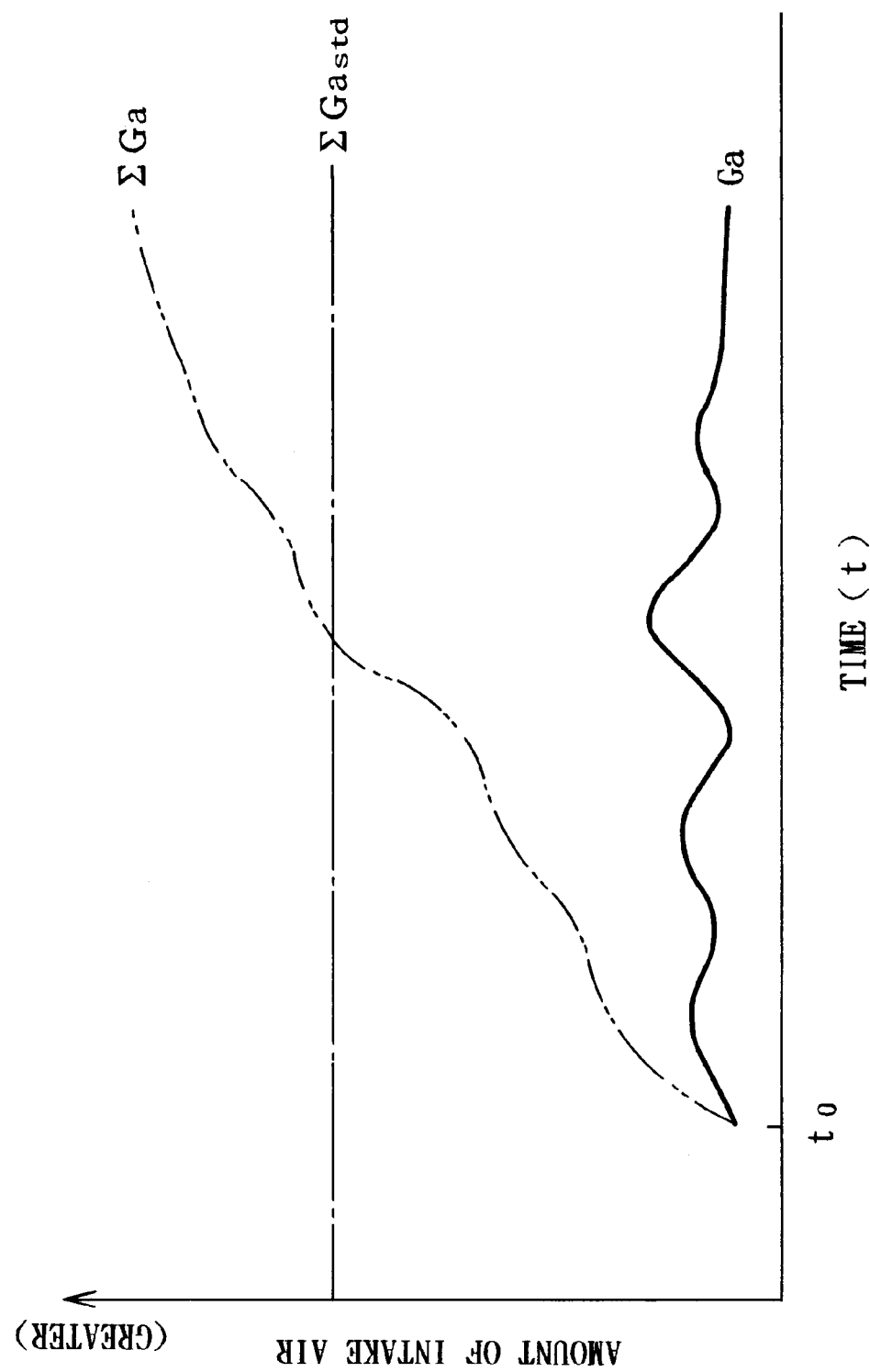
FIG. 12 is a time chart indicating manners of change in the intake air amount and the accumulated intake air amount after the engine is started.

As shown in FIG. 12, the intake air amount Ga fluctuates over time in accordance with the amount of depression of the accelerator pedal after the engine 1 is started (time point t0). The accumulated intake air amount ΣGa, i.e., an integral of the intake air amount Ga over time, increases with time. The accumulated intake air amount ΣGa is basically in approximate proportion to the total quantity of heat generated by the engine 1.

After calculating the accumulated intake air amount ΣGa up to the present intake air amount Ga in step 402, the ECU 51 temporarily ends this routine.

As in the first embodiment, the thermostat abnormality detector apparatus of the second embodiment uses the control program including the two control procedures, i.e., the thermostat abnormality detecting routine and the fuel injection timing control routine. The second embodiment is also similar to the first embodiment in that in the thermostat abnormality detecting routine, at the time when the operating condition parameter related to the quantity of heat generated by the engine 1 reaches a predetermined prescribed operating condition quantity, the cooling water temperature actually detected by the water temperature sensor 41 is compared with the cooling water temperature criterion T1 determined on the basis of the quantity of heat generated by the engine 1 (that is, the cooling water temperature that is expected to occur at that time on condition that the thermostat 16 is normal) in order to determine whether the thermostat 16 has an abnormality.

However, whereas the first embodiment uses the quantity of engine heat generation based on the amount of intake air as an operating condition parameter, the second embodiment uses the accumulated intake air amount as an operating condition parameter for determining the timing of performing abnormality determination. Thus, the thermostat abnormality detector apparatus of the second embodiment is able to promptly and precisely detect an abnormality in the thermostat 16 by comparing an actually detected value of the cooling water temperature and an estimated value thereof corresponding to the accumulated intake air amount (which is one of the main factors determining the quantity of engine heat generation) at the timing based on the accumulated intake air amount. Therefore, it becomes possible to promptly take countermeasures against the problems caused by the abnormality, such as the overcooling of the engine 1.

Although the second embodiment uses the accumulated amount ΣGa of the intake air amount Ga as a prescribed operating condition quantity without using a correction amount, it is also possible to use correction factors corresponding to the correction coefficients α, β, γ used in the first embodiment, in conjunction with the intake air amount Ga or the accumulated amount ΣGa.

Although the second embodiment uses, as a prescribed operating condition quantity, the total intake air amount ΣGa, which is substantially in one-to-one correspondence to the engine heat generation quantity Q, it is also possible to use another single parameter or a combination of parameters that can derive an estimate of the engine heat generation quantity Q. For example, it is possible to adopt a design wherein the abnormality determination regarding the thermostat 16 is performed when a function using a combination of variants of intake temperature, engine revolution speed and exhaust temperature assumes a predetermined value. This design makes it possible to apply the invention to not only internal combustion engines such as gasoline engines, diesel engines or the like, but also other engines or motors such as an electric motor.

Although the first and second embodiments calculate the intake air amount Ga based on the intake pressure PM detected by the intake pressure sensor 45, it is also possible to directly detect an intake air amount by using, for example, a airflow meter or the like. Additionally, although the foregoing embodiments calculate a quantity of engine heat generation or an amount of intake air for one explosion/combustion stroke at every fuel injection, it is also possible to calculate a quantity of engine heat generation or an amount of intake air by a periodical-interrupting control routine.

Third to fifth embodiments of the invention will now be described. As in the first and second embodiments, the thermostat abnormality detector apparatus in each of the third to fifth embodiments is applied to an automotive engine cooling system and determines whether the operating condition of the thermostat is normal or abnormal after the engine is started.

In the thermostat abnormality detector apparatus in each of the third to fifth embodiments, the construction of the automotive engine cooling system (see FIG. 1) and the circuit arrangement of the electronic control unit (ECU) 51 are substantially the same as in the first and second embodiments and therefore, will not be discussed in detail.

In the third to fifth embodiments, the thermostat valve 16 closes the connecting passage 14 when the water temperature is equal to or lower than 80° C. When the water temperature becomes higher than 80° C., the thermostat valve 16 opens the connecting passage 14.

Figure 13:
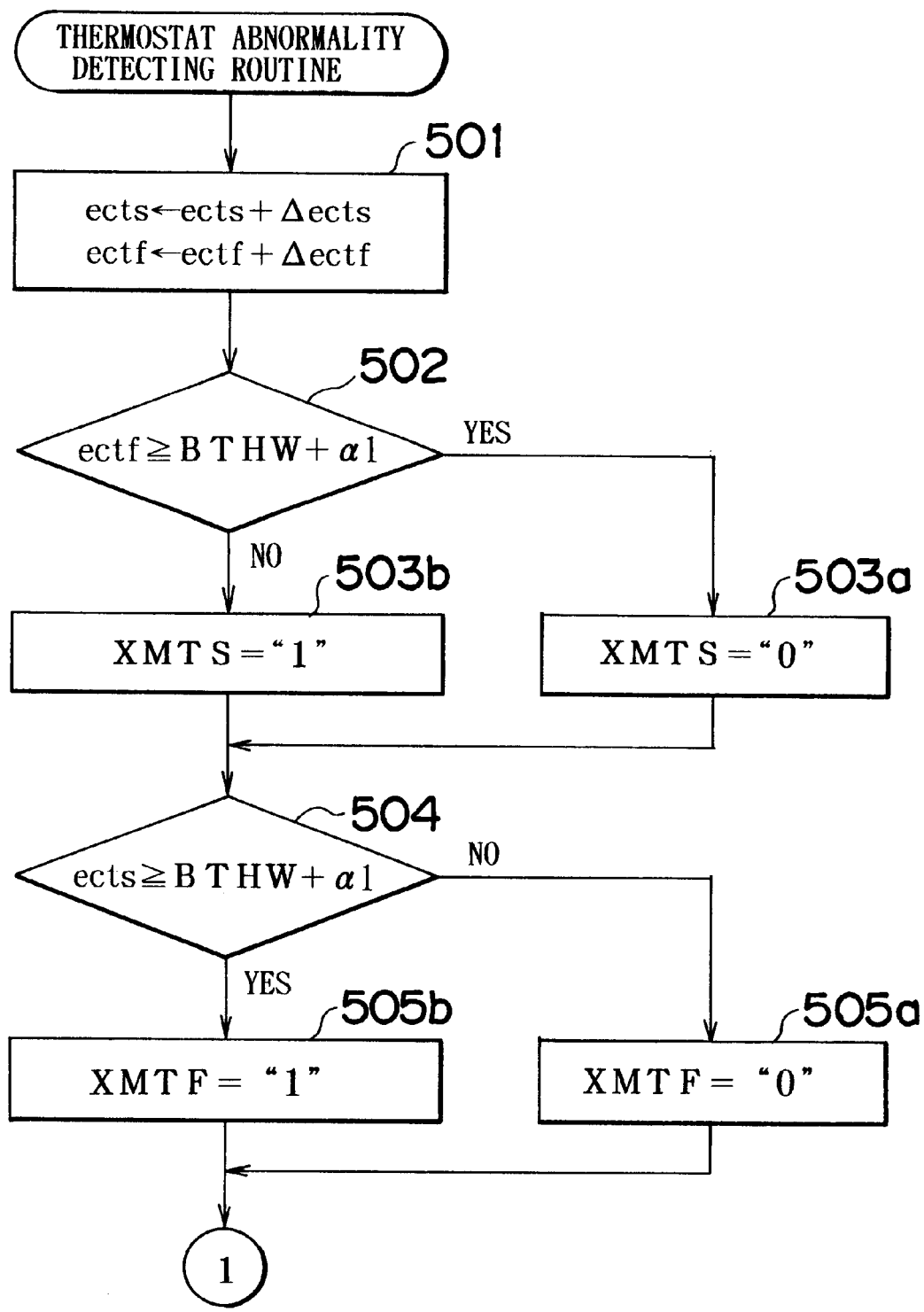
FIGS. 13 and 14 show a flowchart illustrating a thermostat abnormality detecting procedure according to a third embodiment.
Figure 14:
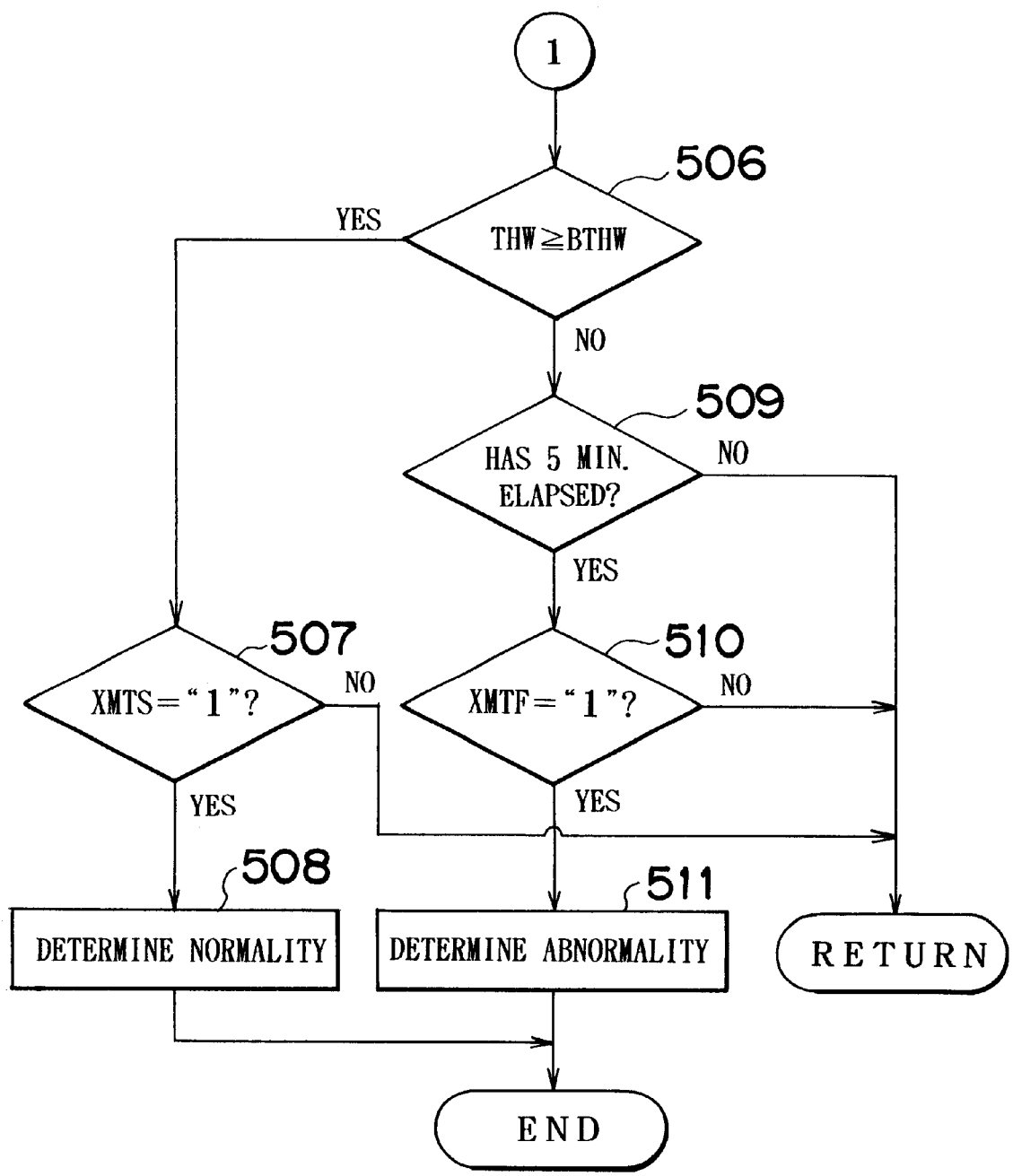

A thermostat abnormality detecting routine in the thermostat abnormality detection in the third embodiment is illustrated in FIGS. 13 and 14. The program related to this routine is pre-stored in the ROM 53 of the ECU 51. When the main electric power source of the motor vehicle is turned on, the routine is executed every predetermined period of time.

When the thermostat abnormality detecting routine is started, the ECU 51 counts up the count value ects of a normal warm-up counter and the count value ectf of an abnormal warmup counter using predetermined values Aects, Aectf, respectively, in step 501. Each warm-up counter is an estimate counter for calculating an estimate of the present cooling water temperature based on time-varying engine operating conditions, the cooling water temperature at the time of a start of the engine 1, and environmental conditions such as external air temperature. More specifically, each counter provided for determining an estimated cooling water temperature with reference to a pre-stored map (not shown) that is prepared on the basis of various operating conditions such as engine-start water temperature THW0, intake temperature THA, the on or off-state of the heater, engine revolution speed NE, intake air amount and the like. The normal warm-up counter provides an estimated cooling water temperature (count value ects) on the assumption that the thermostat 16 is normally operating. The abnormal warm-up counter provides an estimated cooling water temperature (count value ectf) on the assumption that the thermostat 16 has an abnormality.

Figure 15:
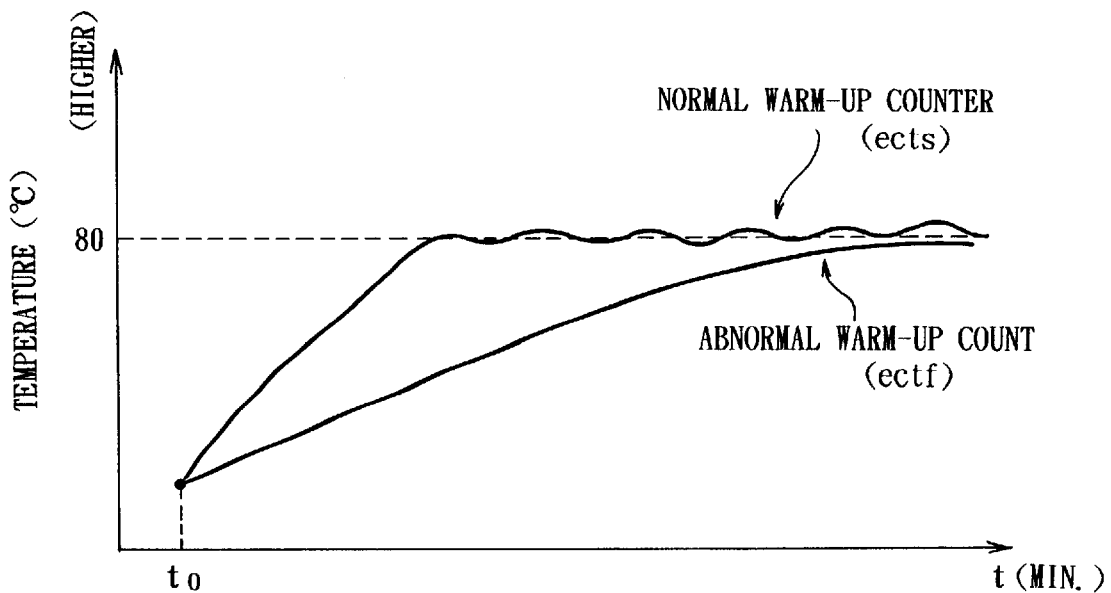
FIG. 15 is a time chart wherein the changing manners of count values of normal and abnormal warm-up counters.

As indicated in FIG. 15, the estimated cooling water temperature provided by the normal warm-up counter (hereinafter, simply referred to as "normal warm-up count") ects normally continues to monotonously increase for a certain time after a start of the engine 1 (time point t0). After reaching a predetermined temperature (for example, 80° C.), the normal warm-up count ects remains substantially at a constant temperature. This is because thermostat 16 maintains its closed state until the cooling water temperature reaches 80° C., and it assumes the open state when the cooling water temperature becomes equal to or higher than 80° C. and it returns to the closed state when the cooling water temperature decreases below 80° C. Thus the thermostat 16 alternately assuming the two states.

On the other hand, the estimated cooling water temperature provided by the abnormal warm-up counter (hereinafter, simply referred to as "abnormal warm-up count") ectf increases at a lower rate than the normal warm-up count ects, thereby exhibiting a relatively gentle slope in the timing chart. This is because when abnormal, the thermostat 16 remains open to constantly allow cooling water to circulate between the radiator 8 and the water jacket 7 of the engine 1. Therefore, when the cooling water temperature is low at the time of a start of the engine 1 or immediately after the engine 1 is started, the overcooled state occurs.

Subsequently, in step 502 in FIG. 13, the ECU 51 determines whether the abnormal warm-up count ectf is equal to or greater than a pre-set cooling water temperature criterion (BTWH+$\alpha 1$). If the determination is affirmative, operation proceeds to step 503$a$. If the determination is negative, operation proceeds to step 503$b$.

In step 503$a$, a normality determination permission flag XMTS is set to "0". On the other hand, in step 503$b$, the normality determination permission flag XMTS is set to "1". Either step is followed by step 504.

In step 504, the ECU 51 determines whether the normal warm-up count ects is equal to or greater than the pre-set cooling water temperature criterion (BTWH+$\alpha 1$). If the determination is negative, operation proceeds to step 505$a$. If the determination is affirmative, operation proceeds to step 505$b$.

In step 505$a$, the abnormality determination permission flag XMTF is set to "0" (the flag is not set). On the other hand, in step 505$b$, the abnormality determination permission flag XMTF is set to "1". Either step is followed by step 506 (FIG. 14).

In step 506, the ECU 51 determines whether a cooling water temperature actually detected by the water temperature sensor 41 is equal to or higher than a value obtained by subtracting the constant $\alpha 1$ from the cooling water temperature criterion (BTWH+$\alpha 1$), i.e., a reference water temperature BTWH. If the determination is affirmative, operation proceeds to step 507. If the determination is negative, operation proceeds to step 509.

In step 507, the ECU 51 determines whether the normality determination permission flag XMTS has been set to "1". If the determination is negative, that is, if the normality determination permission flag XMTS is "0" (unset), the ECU 51 temporarily ends this routine. Conversely, if the determination in step 507 is affirmative, operation proceeds to step 508, where the ECU 51 determines that the thermostat 16 is normal. Then the ECU 51 ends this cycle of the routine. If the ECU 51 ends this routine after the determination in step 508, the ECU 51 inhibits a further interrupt execution of this routine.

Conversely, if the determination in step 506 is negative, operation proceeds to step 509, where the ECU 51 determines whether a predetermined length of time (5 minutes in this embodiment) has elapsed following the start of the engine 1. If the determination is affirmative, operation proceeds to step 510. If the determination is negative, the ECU 51 temporarily ends this routine.

In step 510, the ECU 51 determines whether the abnormality determination permission flag XMTF has been set to "1". If the determination is negative, the ECU 51 temporarily ends this routine. If the determination is affirmative, operation proceeds to step 511, where the ECU 51 determines that the thermostat 16 has an abnormality. Then, the ECU 51 ends this routine, and inhibits a further interrupt execution of this routine.

If after step 508 or 511, the ECU 51 ends the present execution of the routine and inhibits a further interrupt execution of the routine, the ECU 51 does not execute this routine until the engine 1 is started again.

The ECU 51 detects an abnormality of the thermostat 16, that is, an operation failure thereof in the fully open or semi-open state, through the thermostat abnormality detecting routine as described above. If it is determined that the operation of the thermostat 16 is normal, the ECU 51 confirms the normality. As is apparent from the description of this routine, the ECU 51 calculates an estimate of the cooling water temperature on the assumption that the thermostat 16 is normal, and another estimate of the cooling water temperature on the assumption that the thermostat 16 has an abnormality, in the form of the normal warm-up count ects and the abnormal warm-up count ectf, respectively, on the basis of various operating condition parameters.

The ECU 51 uses the abnormal warm-up count ectf being lower than the cooling water temperature criterion (BTWH+$\alpha 1$) after a start of the engine 1, as a condition for permitting determination that the thermostat 16 is normally operating (step 503$b$). Naturally, the ECU 51 uses the abnormal warm-up count ectf being equal to or greater than the cooling water temperature criterion (BTWH+$\alpha 1$), as a condition for inhibiting determination that the thermostat 16 is normally operating (step 503$a$).

Furthermore, the ECU 51 uses the normal warm-up count ects being equal to or greater than the cooling water temperature criterion (BTWH+$\alpha 1$) after a start of the engine 1, as a condition for permitting determination that the thermostat 16 has an abnormality (step 505$b$). Naturally, the ECU 51 uses the normal warm-up count ects being less than the cooling water temperature criterion (BTWH+$\alpha 1$), as a condition for inhibiting determination that the thermostat 16 has an abnormality (step 505a).

With establishment of the permission or inhibition conditions regarding determination of normality or abnormality of the thermostat 16, it is determined whether the thermostat 16 is normal or abnormal in the following manner. It is determined that the operation of thermostat 16 is normal in the case where the cooling water temperature THW actually detected by the water temperature sensor 41 becomes equal to or higher than the reference water temperature BTWH before the predetermined length of time (5 min.) has elapsed following the start of the engine 1 and where the normality determination permission condition has been established, i.e., the normality determination permission flag XMTS has been set to "1". Furthermore, even if it is after the elapse of 5 min. that the actually detected cooling water temperature THW becomes equal to or higher than the reference water temperature BTWH, it is determined that the thermostat 16 is normal provided that the abnormality determination inhibition condition has been established (XMTF="0") and that the normality determination permission condition has been established (XMTS="1").

It is determined that the thermostat 16 has an abnormality, in the case where the cooling water temperature THW actually detected by the water temperature sensor 41 remains less than the reference value BTWH even after the elapse of 5 minutes and where the abnormality determination permission condition has been established (XMTF="1").

The relationship between the over-time changes in the actual cooling water temperature THW, the normal warm-up count ects and the abnormal warm-up count ectf in an engine cooling system equipped with the abnormality detector apparatus of this embodiment will be described with reference to FIGS. 16 and 17. In the FIGS. 16 and 17, reference characters ects, ectf, BTWH, XMTF, XMTS and the like represent the same factors as in the flowcharts of FIGS. 13 and 14.

Figure 16:
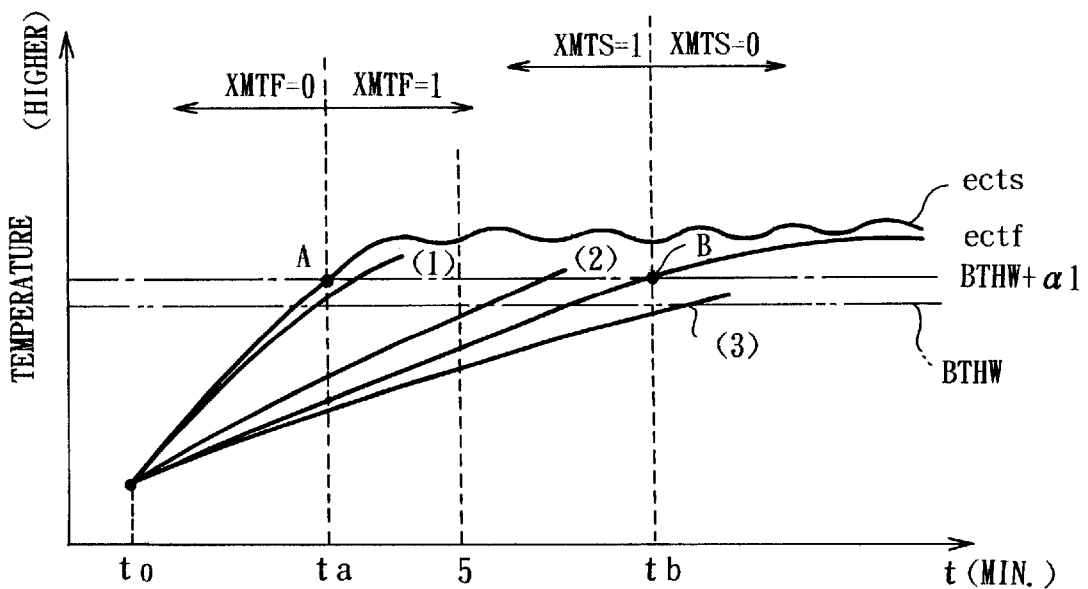
FIG. 16 is a time chart indicating a manner of change in the cooling water temperature after the engine is started.

FIG. 16 shows, as an example, the over-time changes in the cooling water temperature THW and so on in a case where an operation failure has occurred in the thermostat 16 (failing to operate while being in the open valve state) in the engine cooling system equipped with the abnormality detector apparatus of this embodiment. As indicated in the graph of FIG. 16, the normal warm-up count ects reaches the water temperature criterion (BTWH+$\alpha$1) at point A (time point ta), and the abnormal warm-up count ectf reaches the cooling water temperature criterion (BTWH+$\alpha$1) at point B (time point tb). If the cooling water temperature THW becomes equal to or higher than the reference water temperature BTWH before the elapse of 5 minutes following the start of the engine 1 while the normality determination permission flag XMTS is "1", as in a transition pattern indicated by curve (1), or if the cooling water temperature THW becomes equal to or higher than the reference water temperature BTWH before the elapse of 5 min. while the normality determination permission flag XMTS and the abnormality determination permission flag XMTF are "1" and "1", respectively, as in a transition pattern indicated by curve (2), it is determined that the thermostat 16 is operating normally.

If after the elapse of 5 minutes, the cooling water temperature THW remains below the reference water temperature BTWH although the abnormal warm-up count ectf has become equal to or higher than the cooling water temperature criterion (BTWH+$\alpha$1), as in a transition pattern indicated by curve (3), it is determined that there is an abnormality in the operation of the thermostat 16.

Thus, the thermostat abnormality detector apparatus of the embodiment improves the precision and reliability in thermostat abnormality detection by calculating an estimated cooling water temperature on the assumption that the operation of the thermostat is normal and another estimated cooling water temperature on the assumption that the operation of the thermostat is abnormal, and using the two estimated cooling water temperatures as criteria for the determination as to whether the thermostat has an abnormality.

Figure 17:
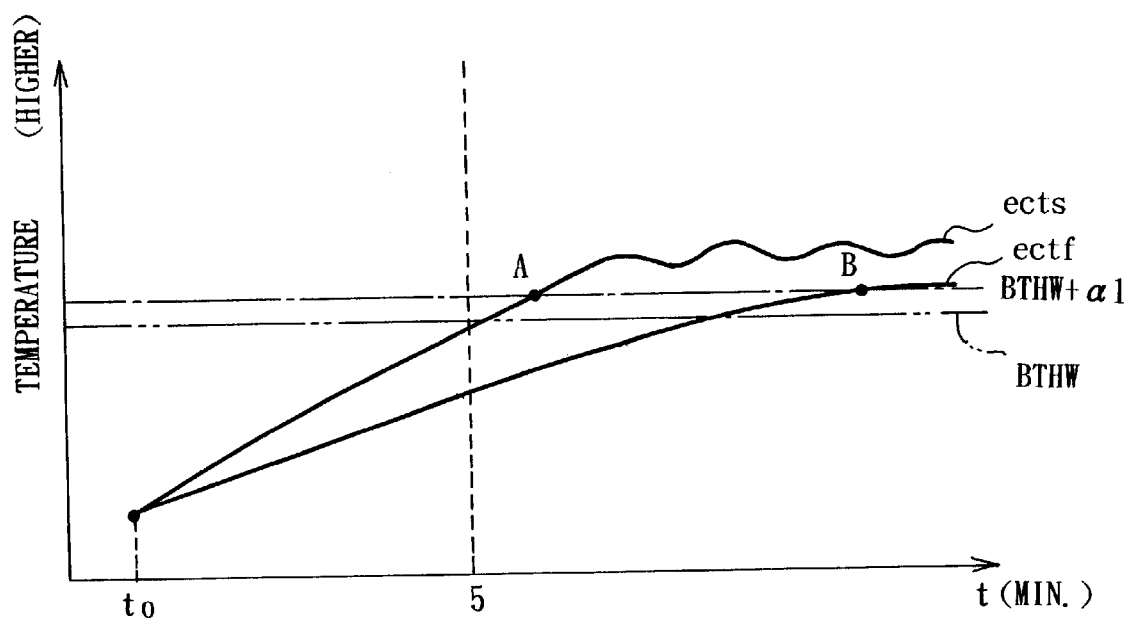
FIG. 17 is a time chart indicating a manner of change in the cooling water temperature after the engine is started.

In a case where the normal warm-up count ects remains below the cooling water temperature criterion (BTWH+$\alpha$1) even after the elapse of the predetermined length of time (5 min.) following the start of the engine 1 as indicated in FIG. 17, it is determined that the cooling system is under a condition that the cooling water temperature cannot easily be increased due to the engine operating condition, environment or the like, regardless of the operating condition of the thermostat 16. Therefore, the determination as to whether the thermostat 16 is normal or abnormal is withheld. The withholding of determination in this embodiment of the invention includes the withholding in a broader sense covering, for example, a temporary suspension and a cease, i.e., the withholding of determination in the present execution of the routine, the withholding of determination until the engine is started again, and the like.

Therefore, even under a condition that the cooling water temperature does not easily increase, the thermostat abnormality detector apparatus of this embodiment is able to suitably prevent false detection by taking the condition into consideration. For example, if during a warm-up operation the slope of increase of the cooling water temperature is gentle so that it may be inferred that there is an abnormality in the operation of the thermostat, the apparatus of the embodiment withholds determination that the thermostat has an abnormality, provided that there is a possibility that the sluggish increase of the cooling water temperature may be caused by another factor, such as engine operating condition, environmental condition or the like. Therefore, the apparatus of the embodiment is able to prevent a false determination even in the aforementioned case.

That is, this embodiment improves the precision and reliability in the detection of normality and abnormality of the thermostat by adopting, as criteria for the thermostat abnormality determination, two different estimated cooling water temperature values, one water temperature value provided on the assumption that the operation of the thermostat is normal and another water temperature value provided on the assumption that the operation thereof is abnormal. The embodiment also improves precision by providing permission conditions for the normality determination and the abnormality determination regarding the thermostat.

Furthermore, the embodiment is able to suitably prevent a false determination as to whether the thermostat is normal or abnormal by temporarily withholding the determination if the cooling water temperature provided on the assumption of normal operation of the thermostat is below the reference water temperature.

The fourth embodiment of the invention will now be described, mainly focusing on the features that distinguish the fourth embodiment from the third embodiment. As in the third embodiment, the apparatus in the fourth embodiment is applied to an automotive engine cooling system, and determines whether the operating condition of the thermostat is normal or abnormal after the engine is started.

Figure 18:
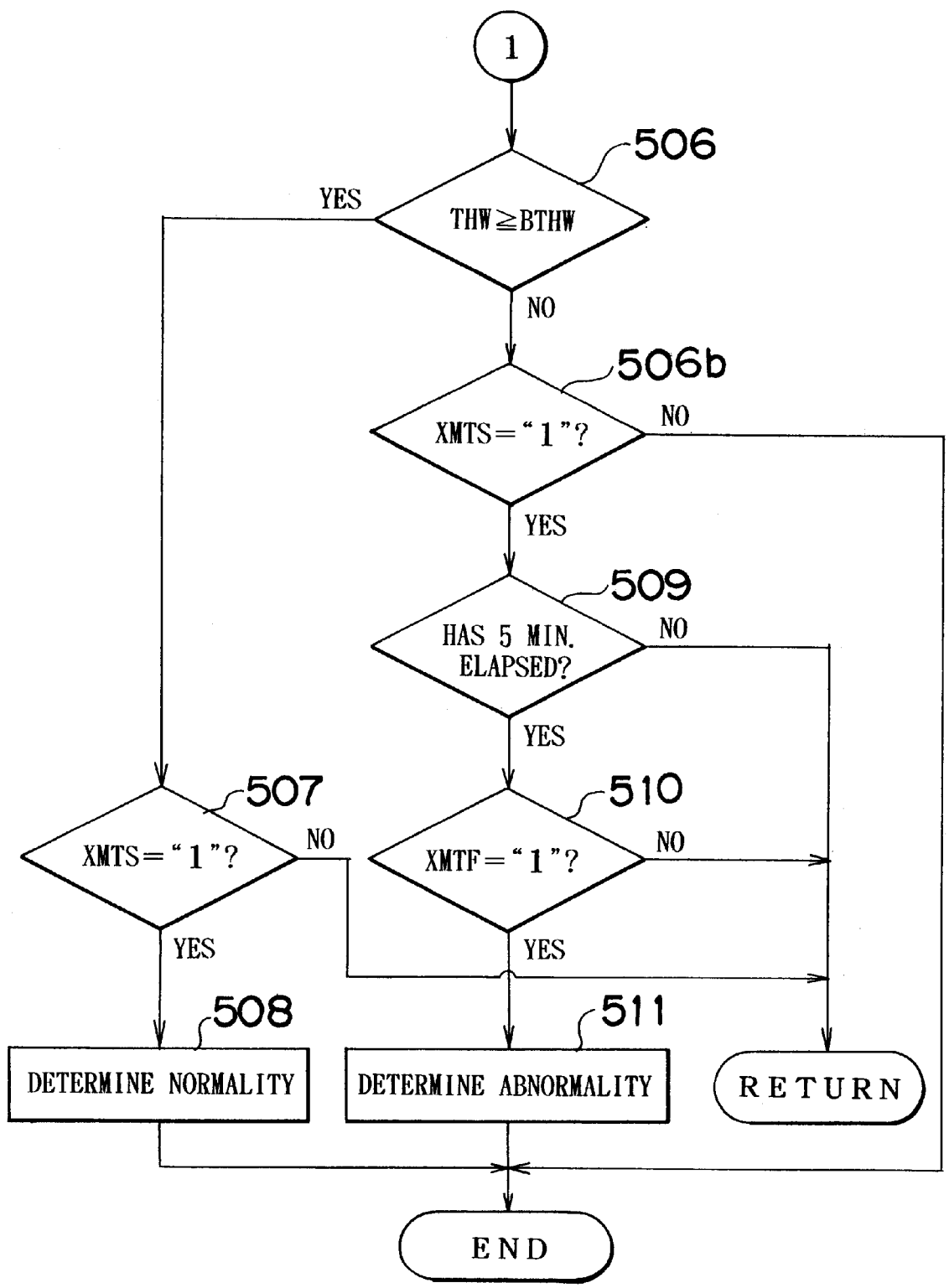
FIG. 18 is a flowchart illustrating a thermostat abnormality detecting procedure according to a fourth embodiment.

The apparatus of the fourth embodiment employs a thermostat abnormality detecting routine similar to that illustrated in FIGS. 13 and 14, except that the portion of the thermostat abnormality detecting routine illustrated in FIG. 14 is replaced by the process illustrated in FIG. 18. In the figures, comparable steps are represented by comparable reference characters and perform comparable operations.

In the thermostat abnormality detecting routine in the fourth embodiment, if the determination in step 506 (see FIG. 18) is negative, that is, if the cooling water temperature THW detected by the water temperature sensor 41 is lower than the reference water temperature BTWH, operation proceeds to step 506b.

In step 506b, the ECU 51 determines whether the normality determination permission flag XMTS, described in conjunction with steps 502, 503a and 503b (FIG. 13), has been set to "1". If the determination is affirmative, operation proceeds to step 509.

Conversely, if the determination in step 506b is negative, the ECU 51 ends this routine, and inhibits a further interrupt execution of this routine until the next time the engine 1 is started.

Due to the provision of step 506b, the apparatus of the embodiment refrains from making a determination as to whether the thermostat 16 is abnormal or normal if the abnormal warm-up count ectf becomes equal to or higher than the cooling water temperature criterion before the cooling water temperature THW detected by the water temperature sensor 41 reaches the reference water temperature BTWH.

This arrangement also achieves substantially the same advantages as achieved by the detection of an abnormality in the thermostat 16 in the third embodiment. Furthermore, the fourth embodiment more favorably prevents a false detection even in a case where the engine operating condition or the environment condition does not meet the conditions for highly reliable determination.

The fifth embodiment of the invention will be described, mainly focusing on the features that distinguish the fifth embodiment from the third embodiment. As in the third embodiment, the apparatus in the fifth embodiment is applied to an automotive engine cooling system, and determines whether the operating condition of the thermostat is normal or abnormal, after the engine is started.

Figure 19:
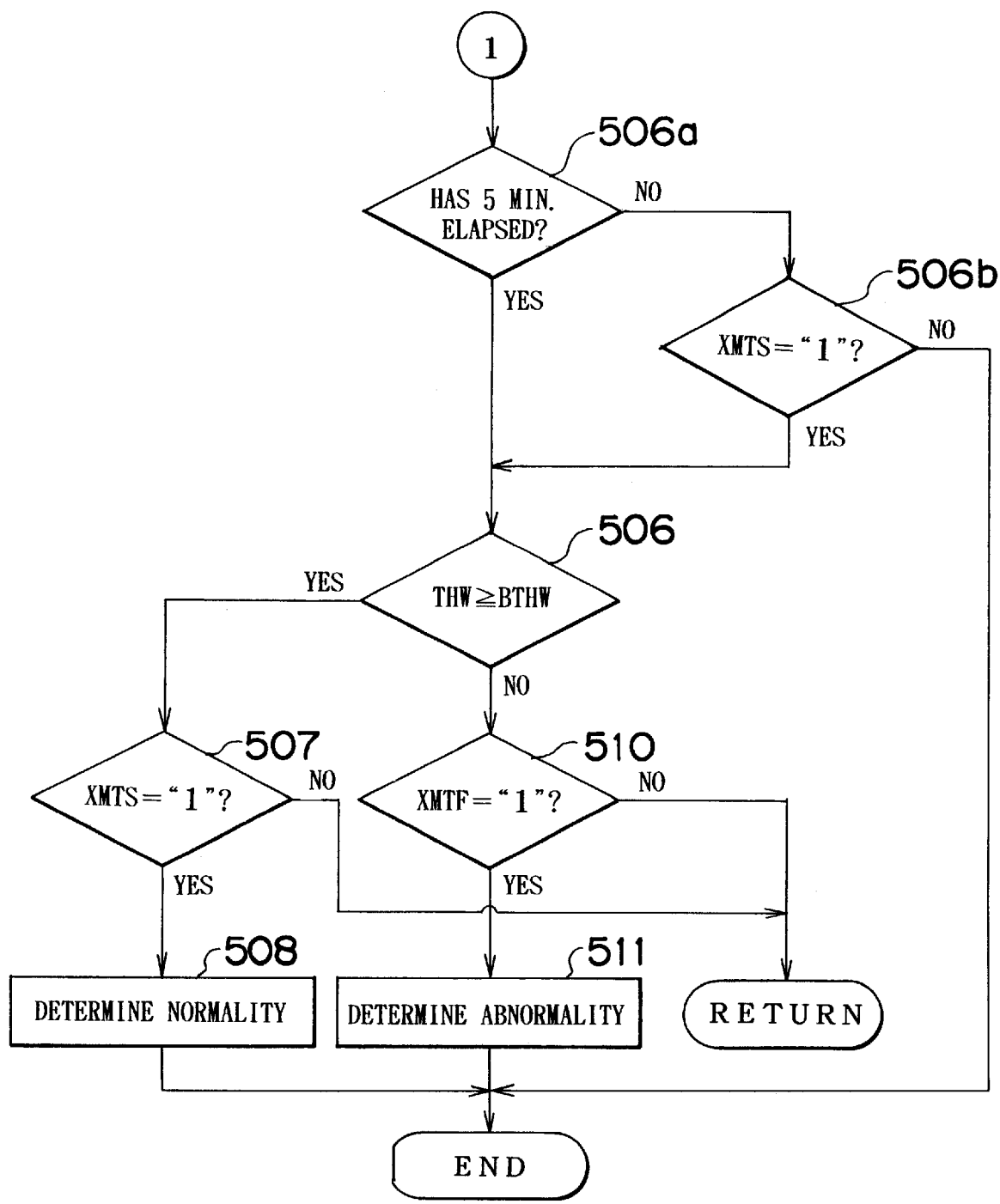
FIG. 19 is a flowchart illustrating a thermostat abnormality detecting procedure according to a fifth embodiment.

The apparatus of the fifth embodiment employs a thermostat abnormality detecting routine similar to that illustrated in FIGS. 13 and 14, except that the portion of the thermostat abnormality detecting routine illustrated in FIG. 14 is replaced by the process illustrated in FIG. 19. In the figures, comparable steps are represented by comparable reference characters, and perform comparable operations.

As shown in FIG. 19, step 506a of the fifth embodiment determines whether 5 min. has elapsed, similar to step 509 of the third embodiment. Subsequently, operation proceeds to step 506 or step 506b depending on the determination in step 506a. If the determination in step 506a is affirmative, operation proceeds to step 506. If it is determined in step 506a that 5 min. has not elapsed yet, it is determined in step 506b whether the normality determination permission flag XMTS has been set to "1". If the determination is negative, the ECU 51 ends this routine, and inhibits an interrupt execution of the routine until the next time the engine 1 is started. If the ECU 51 makes negative determination in step 506, the ECU 51 does not perform the processing corresponding to step 509 in the third embodiment, but proceeds to step 510.

Figure 20:
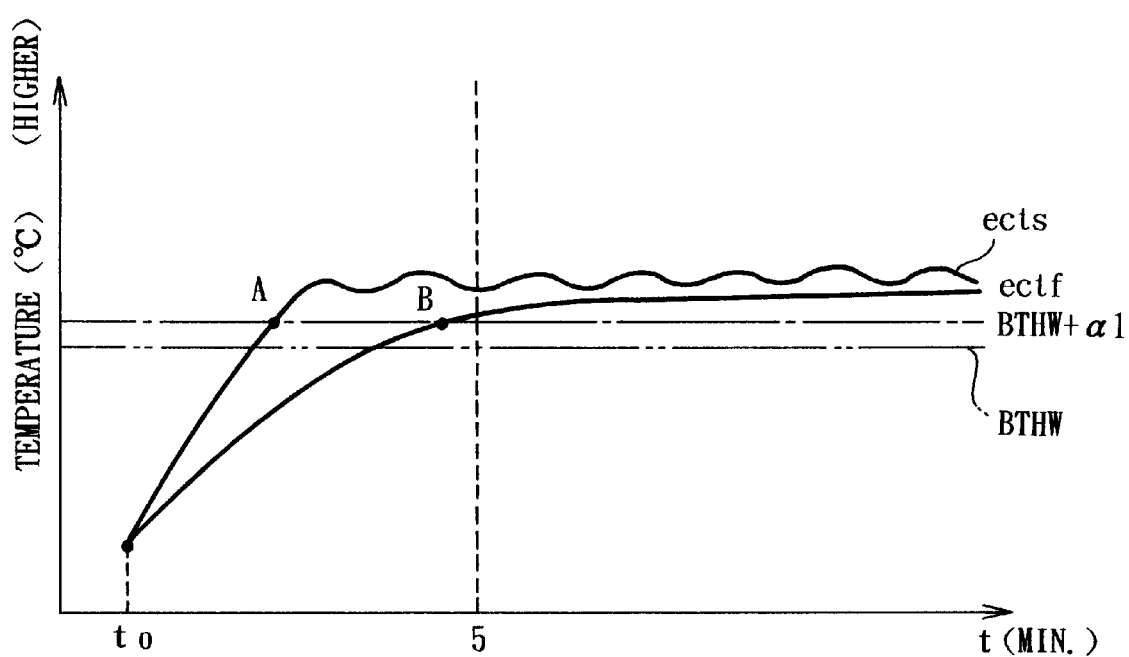
FIG. 20 is a time chart indicating a manner of change in the cooling water temperature after the engine is started.

With this design of the routine in the fifth embodiment, as shown in FIG. 20, if the abnormal warm-up count ectf reaches the cooling water temperature criterion (BTWH+ α1) before the elapse of the predetermined length of time (5 min.) following a start of the engine 1, it is determined that the cooling system is under a condition that the cooling water temperature THW can easily be increased due to engine operating condition, environment or the like, regardless of the operating condition of the thermostat 16. Therefore, the apparatus of the invention does not perform a determination as to whether the thermostat 16 is normal or abnormal. Consequently, the apparatus of the embodiment suitably prevents a false determination as to whether the thermostat 16 is normal or abnormal.

As described above, the fifth embodiment also achieves substantially the same advantages as achieved by the detection of an abnormality in the thermostat 16 in the third embodiment. Furthermore, as in the fourth embodiment, the fifth embodiment more favorably prevents a false detection in a case where the engine operating condition or the environment condition does not meet the conditions for highly reliable determination.

For example, if during a warm-up operation the slope of increase of the cooling water temperature is sufficiently sharp so that it may be inferred that the operation of thermostat is normal, the apparatuses of the fourth and fifth embodiment withhold determination that the thermostat is normal, provided that there is a possibility that the high increasing rate of the cooling water temperature may be attributed to another factor, such as engine operating condition, environmental condition or the like. Therefore, the apparatuses of the fourth and fifth embodiment are able to suitably prevent a false determination even in the aforementioned case.

Although each of the third to fifth embodiments employs two different devices, the warm-up counters for estimating cooling water temperatures on the two different assumptions regarding the normality and abnormality of the thermostat 16, it is also possible to provide three or more estimating devices, assuming, for example, an abnormal condition that the thermostat 16 fails to operate while being in a semi-open state, an abnormal condition that the thermostat 16 fails to operate while being in the fully-open state, and the like.

It is also possible to add a device for estimating a cooling water temperature assuming an abnormal condition that the thermostat 16 fails to operate while being in the closed state. In this arrangement, the estimation of a cooling water temperature can be provided, assuming a condition that the cooling water temperature continues to increase even after reaching or exceeding the predetermined water temperature 80° C., for example. For this arrangement, an algorithm may be designed on the basis of, for example, a logical process wherein when the estimated cooling water temperature provided by the added estimating device reaches the predetermined value, the abnormality determination permission flag is set, and wherein the abnormality determination is made if the cooling water temperature detected by the water temperature sensor 41 exceeds a criterion.

Furthermore, although in the third to fifth embodiments, the elapsed time following a start of the engine 1 is set to 5 minutes as a reference for detection of an abnormality in the thermostat 16, the value of the elapsed time varies depending on the characteristics of an engine and external environmental conditions. Therefore, it is also possible to design an algorithm such that the predetermined elapsed time can be suitably determined on the basis of the cooling water temperature at the time of a start of the engine 1 or the like.

It is also possible to design an algorithm using two conditions to determine normality of the thermostat 16 operation: (1) that after the elapse of a predetermined time following a start of the engine 1, the difference between the cooling water temperature actually detected by the water temperature sensor 41 and the normal warm-up count is within a predetermined range; and (2) after the elapse of the predetermined time; the difference between the actually detected cooling water temperature and the abnormal warm-up count is out of a predetermined range.

Furthermore, the arrangement wherein after the elapse of a predetermined length of time following a start of an engine 1, an abnormality in the cooling system is detected by comparing a plurality of estimated cooling water temperatures provided by cooling water temperature estimating devices with a detection value provided by the water temperature sensor 41, may also be applied to the abnormality detection regarding the water temperature sensor 41.

Sixth to eighth embodiments of the invention will now be described. As in the foregoing embodiments, the thermostat abnormality detector apparatus in each of the sixth to eighth embodiments is applied to an automotive engine cooling system and determines whether the operating condition of the thermostat is normal or abnormal after the engine is started.

In the thermostat abnormality detector apparatus in each of the sixth to eighth embodiments, the construction of the automotive engine cooling system (see FIG. 1) and the circuit arrangement of the electronic control unit (ECU) 51 are substantially the same as in the foregoing embodiments, and will not be described again.

In the sixth to eighth embodiments, the thermostat valve 16 closes the connecting passage 14 when the water temperature is equal to or lower than 82° C. When the water temperature becomes higher than 82° C., the thermostat valve 16 opens the connecting passage 14.

Figure 21:
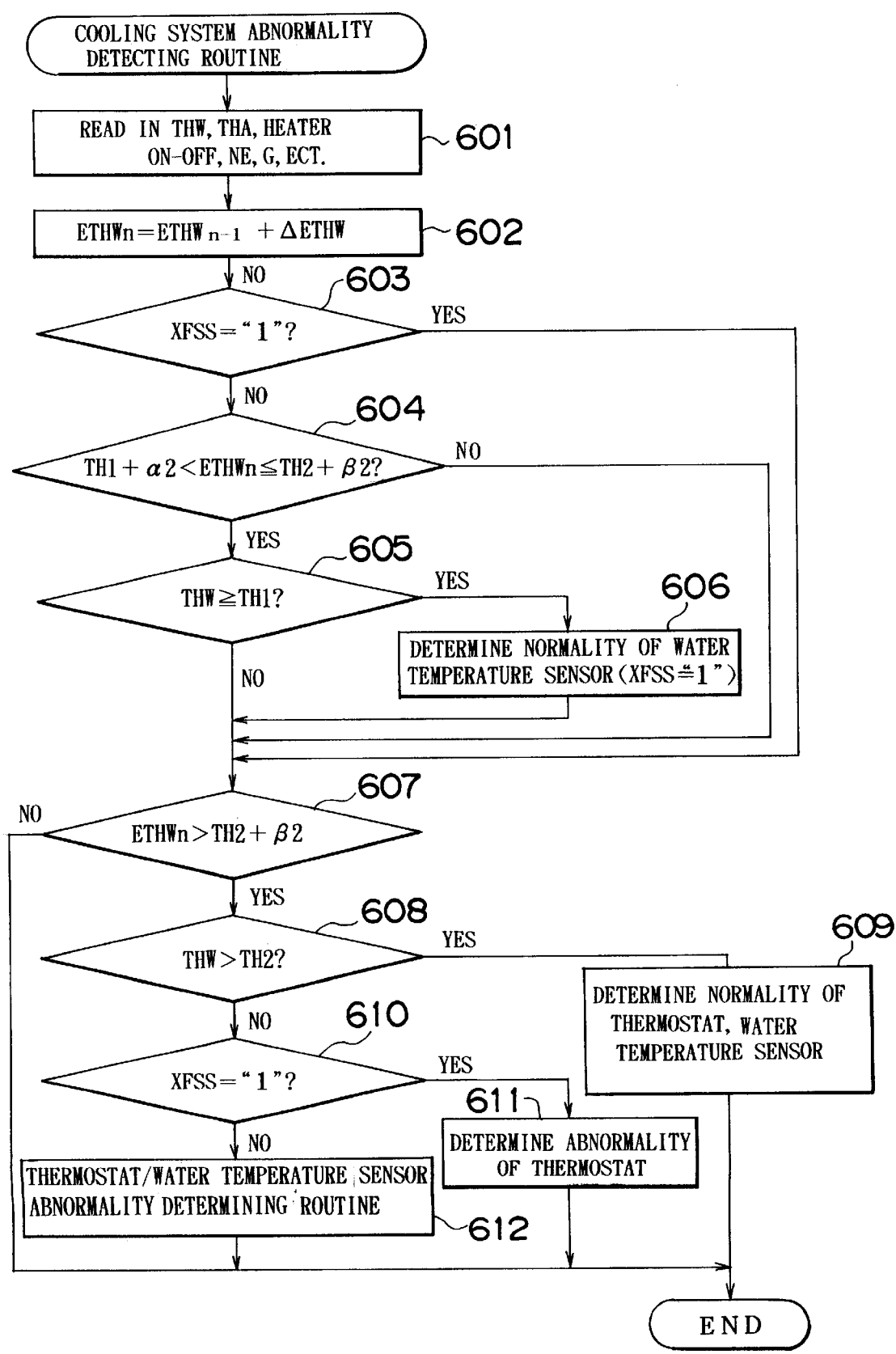
FIG. 21 is a flowchart illustrating a cooling system abnormality detecting procedure according to a sixth embodiment.

FIG. 21 illustrates a cooling system abnormality detecting routine in the cooling abnormality detection in the sixth embodiment. The program related to this routine is prestored in the ROM 53 of the ECU 51. When the main electric power source of the motor vehicle is turned on, the routine is executed every predetermined period of time.

When the cooling system abnormality detecting routine is started in step 601, the ECU 51 reads in various operating condition parameters, such as the detected cooling water temperature THW, the intake temperature THA, the on or off-state of the heater, the engine revolution speed NE, the intake air amount G, and the like.

Subsequently in step 602, the ECU 51 calculates an estimated cooling water temperature ETHWn on the assumption that the thermostat 16 and the water temperature sensor 41 are operating normally. The estimated cooling water temperature ETHWn is calculated by adding a change of estimated water temperature ΔETHW, determined based on the various operating condition parameters read in step 601 with reference to a map of the amount of change in water temperature (not shown), to the previously calculated estimated cooling water temperature ETHWn−1. The map of the amount of change in water temperature has been prepared on the basis of data experimentally obtained considering the heat balance of the cooling water due to the operation of the engine 1. The actual water temperature THW0 detected by the water temperature sensor 41 at the time of a start of the engine 1 is used as an initial value of the estimated cooling water temperature ETHW.

Next, in step 603, the ECU 51 determines whether a sensor normality determination flag XFSS has been set to "1". The setting of the sensor normality determination flag XFSS (XFSS="1") indicates that it has been confirmed that the operation of the water temperature sensor 41 is normal.

If the determination in step 603 is affirmative, operation jumps to step 607. If the determination is negative, operation proceeds to step 604.

In step 604, the ECU 51 determines whether the estimated cooling water temperature ETHW is within a predetermined temperature range. More specifically, it is determined whether the following condition is met:

$$TH1+\alpha 2 < ETHWn \leq TH2+\beta 2 \qquad (2)$$

where TH 1 is a lower limit value, ETHWn is the estimated cooling water temperature, and TH2 is an upper limit value. If the condition is met, operation proceeds to step 605. If the condition is not met, operation jumps to step 607.

In step 605, the ECU 51 determines whether the cooling water temperature THW is equal to or higher than the lower limit value TH1. If the determination is negative, operation proceeds to step 607. If the determination is affirmative, operation proceeds to step 606, where the ECU 51 determines that the operation of the water temperature sensor 41 is normal and sets the sensor normality determination flag XFSS to "1". Then operation proceeds to step 607.

In step 607, the ECU 51 determines whether the estimated cooling water temperature ETHWn calculated in step 602 exceeds the sum of the upper limit value TH2 and the constant β2. If the determination is affirmative, operation proceeds to step 608. If the determination is negative, the ECU 51 temporarily ends this routine.

In step 608, the ECU 51 determines whether the actually detected cooling water temperature THW exceeds the upper limit value TH2. If the determination is affirmative, operation proceeds to step 609. In step 609, the ECU 51 determines that both the thermostat 16 and the water temperature sensor 41 are normal. The ECU 51 then ends the present execution of the routine.

Conversely, if the determination in step 608 is negative, the ECU 51 proceeds to step 610. In step 610, the ECU 51 determines whether the water temperature sensor normality determination flag XFSS described in conjunction with step 606 is presently "1". If the determination is affirmative, operation proceeds to step 611. In step 611, the ECU 51 determines that there is an abnormality in the operating manner of the thermostat 16. Then the ECU 51 ends the present execution of the routine.

If the determination in step 610 is negative, it is determined that either the thermostat 16 or the water temperature sensor 41 has an abnormality. Therefore, the ECU 51 proceeds to step 612, where a thermostat/water temperature sensor abnormality determining routine described below is executed. In the thermostat/water temperature sensor abnormality determining routine, it is determined which one of the thermostat 16 and the water temperature sensor 41 has an abnormality. After going through the routine of step 612, the ECU 51 ends the execution of the cooling system abnormality detecting routine.

If it is determined in step 609 in this routine that both the water temperature sensor 41 and the thermostat 16 are normal, or if it is determined in step 611 that the thermostat 16 has an abnormality, the ECU 51 temporarily ends this routine, and inhibits a further interrupt execution of this routine until the engine 1 is started again.

The thermostat/water temperature sensor abnormality determining routine, which is a sub-routine of the cooling system abnormality detecting routine, will be described with reference to FIG. 22. As mentioned above, the thermostat/water temperature sensor abnormality determining routine (hereinafter, simply referred to as the "sub-routine") is executed by the ECU 51, provided that it has been determined that either the thermostat 16 or the water temperature sensor 41 has an abnormality.

Figure 22:
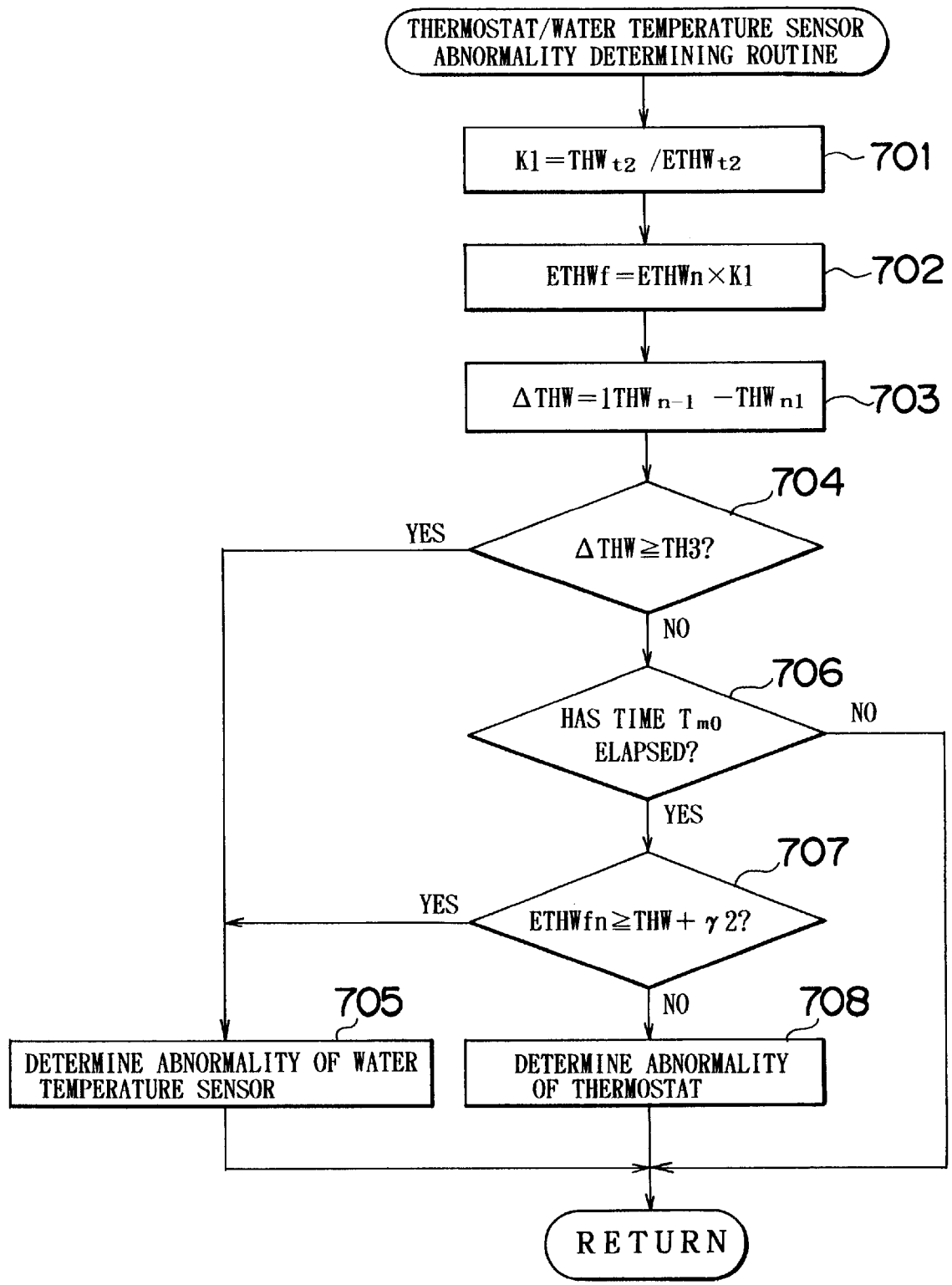
FIG. 22 is a thermostat/water temperature sensor abnormality determining procedure according to the sixth embodiment.

As illustrated in FIG. 22, when the sub-routine is started in step 710, the ECU 51 calculates a deterioration coefficient K1 on the basis of equation (3):

$$K1 = THWt2/ETHWt2 \tag{3}$$

The deterioration coefficient K1 is a ratio of the actually detected cooling water temperature THWt2 and the estimated cooling water temperature ETHWt2 that are provided in the first execution (time point t2) of this sub-routine. The actually detected cooling water temperature THWt2 and the estimated cooling water temperature ETHWt2 used in step 701 are the values that were obtained and temporarily stored in steps 601 and 602 in the main routine of this sub-routine, that is, the cooling system abnormality detecting routine (hereinafter, simply referred to as the "main routine") illustrated in FIG. 21. That is, the deterioration coefficient K1 calculated during the first execution of this sub-routine is repeatedly used as a constant in every execution of this sub-routine.

After calculating the deterioration coefficient K1, the ECU 51 proceeds to step 702. In step 702, the ECU 51 calculates an estimated cooling water temperature ETHWfn (hereinafter, referred to as the "thermostat abnormality estimated temperature") on the assumption that the operation of the thermostat 16 is abnormal whereas the operation of the water temperature sensor 41 is normal, on the basis of equation (4):

$$ETHWfn = ETHWn \times K1 \tag{4}$$

However, in the first execution of this sub-routine, the actually detected cooling water temperature THW is used as the initial value ETHWfl of the thermostat abnormality estimated temperature ETHWfn.

Subsequently in step 703, the ECU 51 subtracts the previously read cooling water temperature THWn−1 from the cooling water temperature THW presently read in during the main routine and stores the absolution value of the result of the subtraction as the latest change ΔTHWn of the cooling water temperature. Next, in step 704, the ECU 51 determines whether the latest change ΔTHWn of the cooling water temperature calculated in step 703 is equal to or greater than a prescribed value TH3. If the determination is affirmative, operation proceeds to step 705. In step 705, the ECU 51 determines that the thermostat 16 is operating normally but that the water temperature sensor 41 has an abnormality. Then the ECU 51 ends the execution of the sub-routine, and returns to the main routine.

Conversely, if the determination in step 704 is negative, operation proceeds to step 706. In step 706, the ECU 51 determines whether a predetermined length of time Tm0 has elapsed following the first execution of the sub-routine (time point t2). If the determination is affirmative, the ECU 51 proceeds to step 707. If the determination is negative, the ECU 51 temporarily ends the execution of the sub-routine.

In step 707, the ECU 51 determines whether the thermostat abnormality estimated temperature ETHWfn calculated in step 702 is equal to or greater than the sum (THW+γ2) of the actually detected cooling water temperature THW and a constant γ2 (positive value). If the determination is affirmative, operation proceeds to step 705. In step 705, the ECU 51 determines that only the water temperature sensor 41 has an abnormality, as described above. Then the ECU 51 ends the execution of the sub-routine.

Conversely, if the determination in step 707 is negative, operation proceeds to step 708. In step 708, the ECU 51 determines that only the thermostat 16 has an abnormality but that the operation of the water temperature sensor 41 is normal. Then the ECU 51 ends the execution of the sub-routine.

If operation returns to the main routine after it is determined in step 705 or 708 that either the water temperature sensor 41 or the thermostat 16 has an abnormality, the ECU 51, after ending the execution of the main routine, inhibits a further interrupt execution of the main routine until the engine 1 is started again.

Through the cooling system abnormality detecting routine and its sub-routine, that is, the thermostat/water temperature sensor abnormality determining routine, the ECU 51 detects an abnormality related to the cooling water temperature adjusting function of the cooling system and, if an abnormality is detected in the cooling system, the ECU 51 determines which one of the thermostat 16 and the water temperature sensor 41 has an abnormality. As is apparent from the description of the main routine and the sub-routine, the ECU 51 provides the estimated cooling water temperature ETHW calculated based on the various engine operating condition parameters and the actually detected cooling water temperature THW, at intervals of a predetermined length of time. Based on the difference between the manners of changes in the estimated cooling water temperature ETHW and the actually detected cooling water temperature THW, the ECU 51 makes one of the three determinations in the cooling system abnormality detecting routine. That is, it is determined in step 609 that both the thermostat 16 and the water temperature sensor 41 are normal; or it is determined in step 611 that the water temperature sensor 41 is normal but the thermostat 16 has an abnormality; or it is determined in step 612 that either the thermostat 16 or the water temperature sensor 41 has an abnormality although it is not determined yet whether which one of them has an abnormality.

More specifically, the ECU 51 performs the determination in accordance with the following logical processes:

(1) If the water temperature actually detected by the water temperature sensor 41 reaches a certain water temperature (TH1) when the estimated cooling water temperature ETHW reaches a predetermined water temperature (TH1+α1), it is determined that the water temperature sensor 41 is normal.

(2) If the actually detected water temperature reaches a certain water temperature (TH2) when the estimated cooling water temperature ETHW further increases and reaches a water temperature (TH2+α2) at which the thermostat 16 should open its valve if it is normal, it is determined that both the thermostat 16 and the water temperature sensor 41 are normal.

(3) Conversely, if the actually detected water temperature does not reach the certain water temperature (TH2) when the estimated cooling water temperature ETHW further increases and reaches the water temperature (TH2+α2) at which the thermostat 16 should open its valve if it is normal, it is determined that either the thermostat 16 or the water temperature sensor 41 has an abnormality.

However, if it has been determined by logical process (1) that the water temperature sensor 41 is normal, then it is determined that only the thermostat 16 has an abnormality.

If it is determined that either the thermostat 16 or the water temperature sensor 41 has an abnormality but it is not determined which one of them is abnormal, the ECU 51 proceeds to step 612, that is, the thermostat/water temperature sensor abnormality determining routine (sub-routine).

The sub-routine has been designed, considering that if the thermostat 16 or the water temperature sensor 41 has an abnormality, the manner of change in the cooling water temperature THW actually detected by the water temperature sensor 41 varies as described above, depending on which one of the thermostat 16 and the water temperature sensor 41 has an abnormality.

(1a) If the thermostat 16 is normal and the water temperature sensor 41 has an abnormality, the increase of the actually detected cooling water temperature THW is limited to a certain level, or the increasing rate becomes very low. Conversely, if the thermostat 16 has an abnormality and the water temperature sensor 41 is operating normally, the actually detected cooling water temperature THW increases at a predetermined rate in accordance with the engine operating condition although the increasing rate of the actually detected cooling water temperature THW is slow in comparison with the case where the thermostat 16 is normal.

(2a) As a characteristic phenomenon in a case where the water temperature sensor 41 has an abnormality, it has been confirmed that a sharp increase or decrease of the detection value within a very short time frequently occurs.

First, considering the difference (1a), the deterioration coefficient K1 corresponding to the ratio between the actually detected water temperature THW and the estimated cooling water temperature ETHW is determined. Next, the thermostat abnormality estimated temperature ETHWf is calculated by accumulating the deterioration coefficient K1 in every execution of the sub-routine, starting with the actually detected cooling water temperature THW read in during the first execution of the sub-routine, as the initial value ETHWfl. The thermostat abnormality estimated temperature ETHWfn means an estimated cooling water temperature provided on the assumption that the thermostat 16 has an abnormality and the water temperature sensor 41 is operating normally.

If the actually detected cooling water temperature THW is lower than the thermostat abnormality estimated temperature ETHWfn and the difference therebetween is greater than a predetermined value γ after the elapse of the predetermined time T0 following the first transition from the main routine to the sub-routine, it is determined that the water temperature sensor 41 has an abnormality. Conversely, if the thermostat abnormality estimated temperature ETHWfn is higher than the actually detected cooling water temperature THW by at least the predetermined value γ, it is determined that the thermostat 16 has an abnormality. The logical process is designed as described above (step 707).

Considering the difference (2a), a logical process is designed such that it is determined that the water temperature sensor 41 has an abnormality, if the absolute value of the difference between the actually detected cooling water temperature THWn−1 read in during the previous execution of the main routine and the actually detected cooling water temperature THW read in during the present execution of the main routine (that is, the amount of increase or decrease) is detected as a value that is equal to or greater than the predetermined value TH3 (step 704).

As described above, after the engine is started, the cooling system abnormality detector apparatus of this embodiment detects an abnormality in the cooling system 2 related to an operation abnormality of the water temperature sensor 41 or the thermostat 16, on the basis of the various operating parameters, such as the cooling water temperature at the time of the start of the engine, the intake temperature, the engine revolution speed, the amount of intake air, and the like. It is determined that the thermostat 16 has an abnormality, if the cooling water temperature actually detected by the water temperature sensor 41 increases to a pre-set water temperature at an increasing slope equal to or greater than a predetermined value, on the presumption that either the thermostat 16 or the water temperature sensor 41 has an abnormality. Conversely, if the cooling water temperature actually detected by the water temperature sensor 41 does not exhibit the increasing slope equal to or greater than the predetermined value, or if the detection value by the water temperature sensor 41 exhibits an amplitude equal to or greater than a predetermined value within a very short time, it is determined that the water temperature sensor 41 has an abnormality.

Therefore, if an operational abnormality has occurred in the cooling system 2 due to a contact failure, a partial disconnection or the like in the signal conduction system of the water temperature sensor 41, the embodiment avoids making a false determination as to which one of the thermostat 16 and the water temperature sensor 41 has an abnormality, and precisely and promptly performs the abnormality determination and detection.

Figure 23:
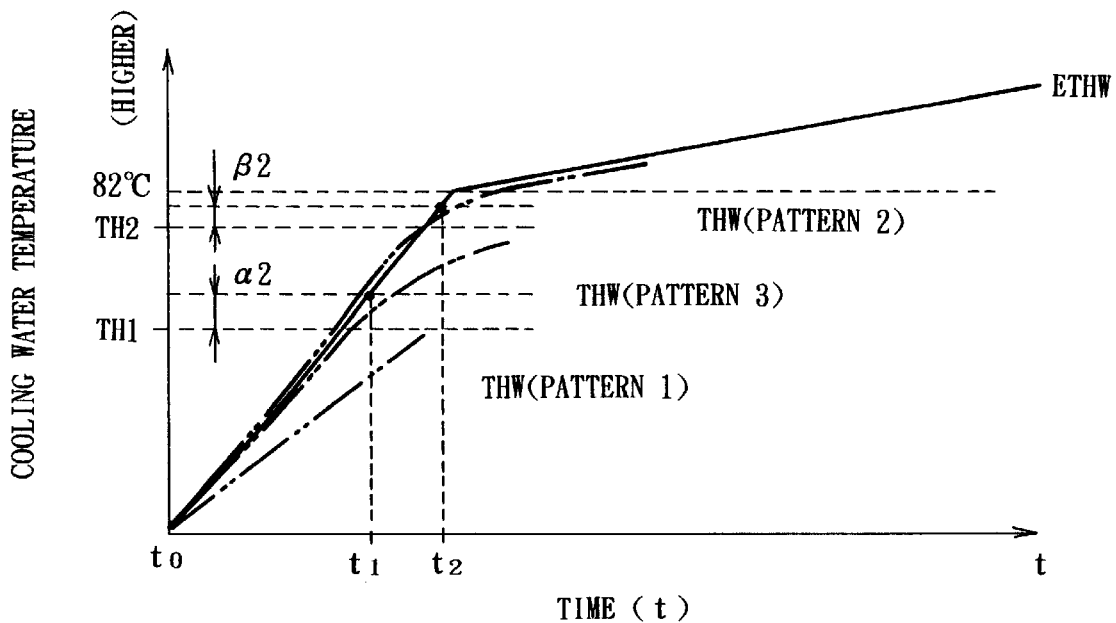
FIGS. 23 and 24 show a manner of change in the cooling water temperature after the engine is started.

FIG. 23 shows, as an example, the manners of changes in the actually detected cooling water temperature THW and the estimated cooling water temperature ETHW (see FIG. 21) after a start of the engine equipped with the cooling system abnormality detector apparatus of this embodiment. As indicated in FIG. 23, the cooling water temperature continues to monotonously increase stating at the engine start time t0 as indicated by the curve of the estimated cooling water temperature ETHW, in the engine equipped with the cooling system wherein the thermostat 16 is operating normally. When the cooling water temperature reaches a predetermined temperature (82° C. in this embodiment), the thermostat valve 16 becomes open so as to curb the temperature increase.

However, if there is an abnormality in the operation of the thermostat 16 or the water temperature sensor 41, the detection value from the water temperature sensor 41, in many cases, decreases so that the apparent temperature increase becomes slow. The temperature (lower limit value TH1) at which the temperature increase significantly differs, between a case where both the thermostat 16 and the water temperature sensor 41 are normal and a case where either of them is abnormal, is pre-set based on experimental results, since the temperature (lower limit value TH1) varies depending on the engine characteristics and the like. If the actually detected cooling water temperature THW is below the lower limit prescribed value TH1 as indicated in pattern 1 of the actually detected cooling water temperature THW in FIG. 23, when the estimated cooling water temperature ETHW reaches a temperature that is the predetermined value α2 higher than the lower limit value TH1 (that is, time t1), it can be considered that either the thermostat 16 or the water temperature sensor 41 has an abnormality.

In the case of pattern 2 of the actually detected cooling water temperature THW, the actually detected cooling water temperature THW has exceeded at least the upper limit prescribed value TH2 when the estimated cooling water temperature ETHW exceeds the value of [upper limit value TH2+predetermined value α2], the value being appropriately set near 82° C., which is the valve opening temperature of the thermostat 16. That is, in pattern 2, the actually detected cooling water temperature THW increases to the predetermined temperature at an increasing rate that is sufficiently great to determine that both the thermostat 16 and the water temperature sensor 41 are normal.

In the case of pattern 3 of the actually detected cooling water temperature THW, when the estimated cooling water temperature ETHW reaches the value of [lower limit value TH1+predetermined value α2], the actually detected cooling water temperature THW has reached the lower limit value TH1. However, the actually detected cooling water temperature THW has not exceeded the upper limit value TH2 when the estimated cooling water temperature ETHW exceeds the value of [lower limit value TH1+predetermined value β2] (time t2). In such a case, it is determined that the water temperature sensor 41 is operating normally but that the thermostat 16 has an abnormality.

If the actually detected cooling water temperature THW exhibits a manner of change or transition as in pattern 1, the ECU 51 further examines and determines which one of the thermostat 16 and the water temperature sensor 41 has an abnormality.

Figure 24:
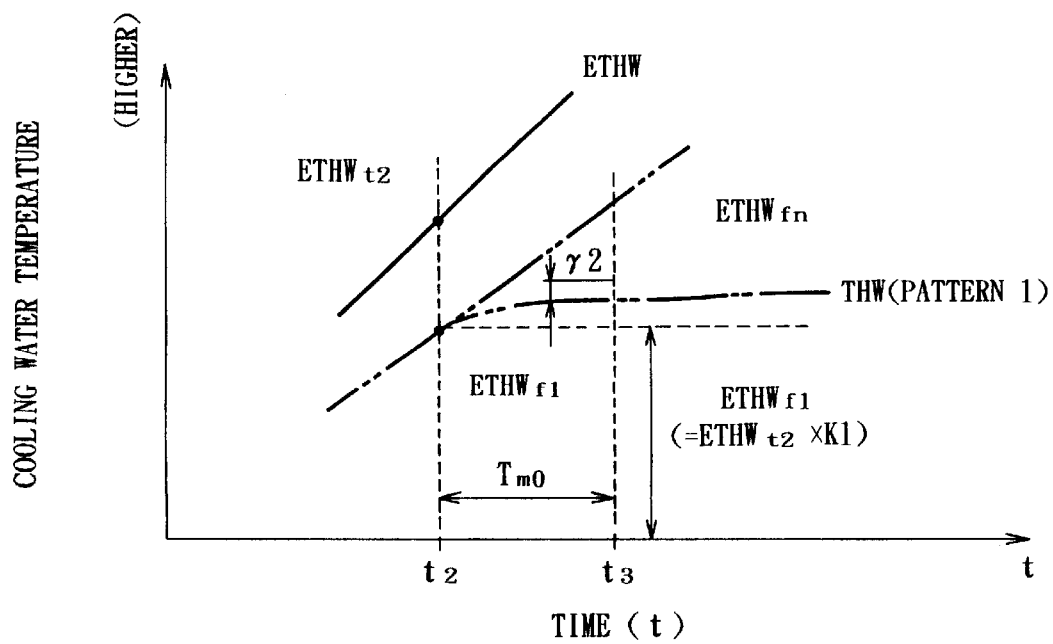

FIG. 24 shows, as an example, the manner of change of the actually detected cooling water temperature THW continuing from pattern 1 after time t2. As indicated in FIG. 24, the ECU 51 sets a new parameter, i.e., the thermostat abnormality estimated temperature ETHWfn, using the actually detected cooling water temperature THW at time t2 as an initial value ETHWfl. The thermostat abnormality estimated temperature ETHWfn corresponds to an estimated cooling water temperature provided on the assumption that the water temperature sensor 41 is operating normally but the thermostat 16 has an abnormality (see FIG. 22), as mentioned above.

An abnormality of the thermostat 16 is that the thermostat 16 is substantially fixed in an open valve state, as mentioned above. Therefore, even if the thermostat 16 is abnormal, the cooling water temperature continues to increase at a slow rate and finally reaches the correct valve opening temperature of the thermostat 16. After the cooling water temperature has reached or exceeded the valve opening temperature, the manner of change of the cooling water temperature does not differ between a case where the thermostat 16 is normal and a case where it is abnormal. In contrast, if there is an abnormality in the water temperature sensor 41, low signal values are continually detected, which phenomenon is not remarkable if the water temperature sensor 41 is normal.

By referring to the manner of change of the thermostat abnormality estimated temperature ETHWfn, which has been set considering the abnormality of the water temperature sensor 41, it can be determined that the water temperature sensor 41 has an abnormality, if the actually detected cooling water temperature THW is at least a predetermined value below the thermostat abnormality estimated temperature ETHWfn at the elapse of the predetermined time Tm0 following time t2, i.e., time t3. Consequently, if the actually detected cooling water temperature THW exhibits the manner of change as in pattern 1, the ECU 51 determines that the water temperature sensor 41 has an abnormality (FIG. 24).

Figure 25:
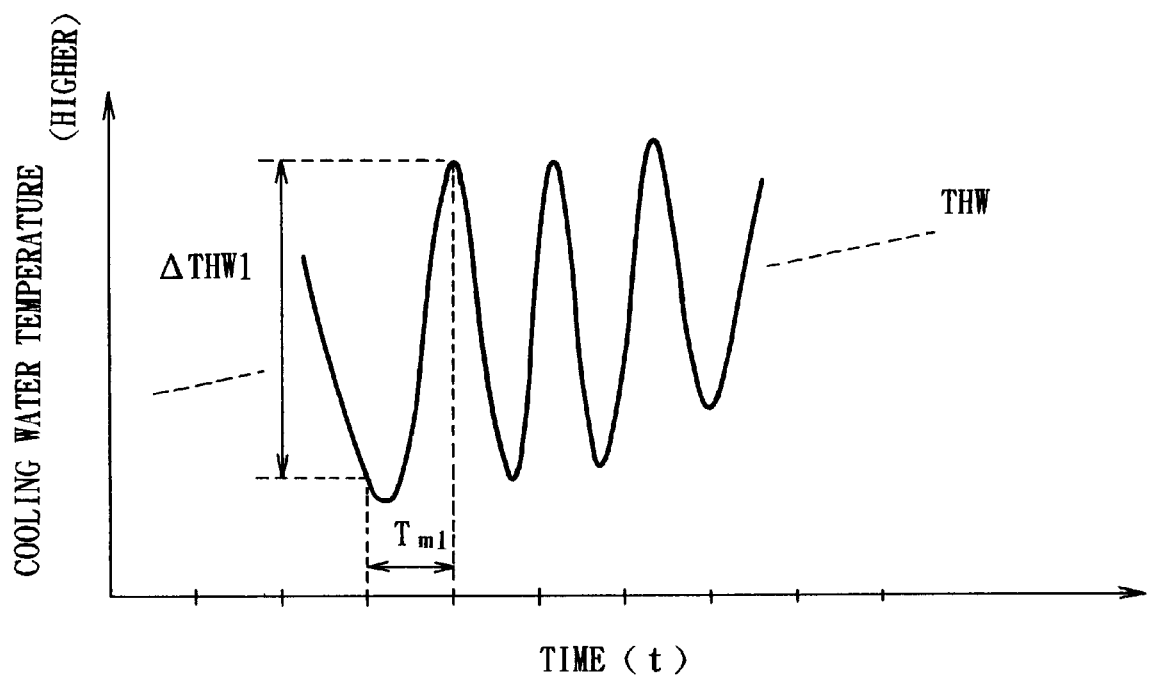
FIG. 25 is a time chart indicating the fluctuation of the detected value of the cooling water temperature during a short period of time.

FIG. 25 shows the manner of change of the cooling water temperature THW actually detected at an arbitrary time after time point t2, wherein the horizontal axis indicating time and the vertical axis indicating temperature are expanded. As shown in FIG. 25, if the amount of change ΔTHWi of the actually detected cooling water temperature during a predetermined very short time, that is, during a processing cycle Ti of the main routine and the sub-routine combined, becomes equal to or greater than predetermined value TH3, it is promptly determined that there is an abnormality in the operation of the water temperature sensor 41. This function is performed independently. Therefore, the precision in detecting an abnormality in the water temperature sensor 41 is further improved.

This embodiment, detecting an abnormality in the cooling system as described above, achieves the following advantages. When an abnormality occurs in the cooling control function of the cooling system, the apparatus of this embodiment promptly and precisely detects the abnormality and precisely determines which one of the thermostat 16 and the water temperature sensor 41 is suffering from the abnormality.

The process of steps 703 and 704 in the sub-routine in the embodiment, wherein if the detection value from the water temperature sensor 41 changes by at least a predetermined width within a very short time, it is determined that the water temperature sensor 41 has an abnormality, is operated independently of the other processes. Therefore, the process of steps 703, 704 may be performed at any time and not necessarily after time t2 but, for example, during the main routine.

Furthermore, in the process of steps 703, 704, the amplitude of the detection value within the very short time is used as a reference value for determining an abnormality in the water temperature sensor 41. However, it is also possible to adopt a process wherein the locus length of the detection signal is calculated by, for example, digitally processing the detection signal in a predetermined time, and if the locus length is equal to or greater than a predetermined value, it is determined that the water temperature sensor 41 has an abnormality.

In the thermostat/water temperature sensor abnormality determining routine in the embodiment, the thermostat abnormality estimated temperature ETHWf is calculated by using as an initial value the water temperature THW actually detected at time t2 and, after that, accumulating the deterioration coefficient K1 to the estimated cooling water temperature ETHW. However, it is also possible to adopt a process wherein after the thermostat abnormality estimated temperature ETHWf has exceeded the valve opening temperature (82° C.) of the thermostat 16, the thermostat abnormality estimated temperature ETHWf is set to a constant value, or the deterioration coefficient K1 is changed to a reduced value.

Furthermore, it is also possible to calculate the thermostat abnormality estimated temperature ETHWf so that the thermostat abnormality estimated temperature ETHWf increases from an initial value set to the water temperature THW actually detected at time t2, at an estimated increasing rate substantially equivalent to the average increasing rate per unit time of the actually detected water temperature THW during the period from the engine start time t0 to time t2. With this calculating process provided, it is also possible to adopt a logical process wherein, once the thermostat abnormality estimated temperature ETHWf exceeds a predetermined temperature (for example, 82° C.), the thermostat abnormality estimated temperature ETHWf is set to a constant value or the estimated increasing rate thereof is reduced. Therefore, it becomes possible to further improve the precision of the thermostat abnormality estimated temperature.

A seventh embodiment of the invention will now be described, mainly focusing on the features that distinguish the seventh embodiment from the sixth embodiment. The apparatus of the seventh embodiment is different from the sixth embodiment in the content of the process that is performed if it is determined that either the thermostat 16 or the water temperature sensor 41 has an abnormality in the cooling system abnormality detecting routine (main routine), i.e., the content of the subroutine corresponding to step 612.

Figure 26:
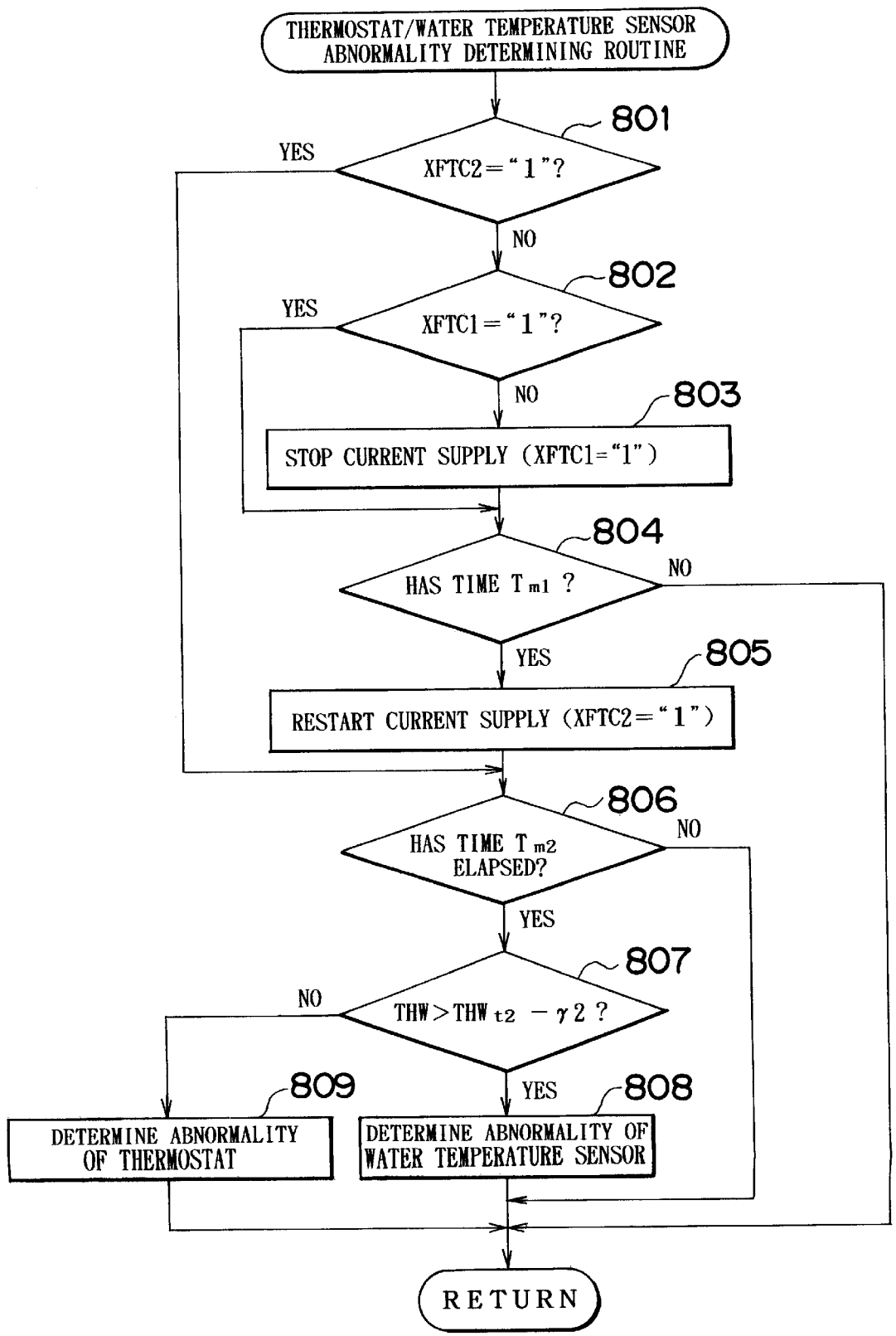
FIG. 26 is a flowchart illustrating a thermostat/water temperature sensor abnormality determining procedure according to a seventh embodiment.

FIG. 26 shows the content of the thermostat/water temperature sensor abnormality determining routine corresponding to the sub-routine. In this sub-routine, the ECU 51 determines in step 801 whether a current supply restart flag XFTC2 is "1". If the determination is affirmative, operation jumps to step 806. If the determination in step 801 is negative, operation proceeds to step 802. In step 802, the ECU 51 determines whether a current supply stop flag XFTC 1 is "1". If the determination is affirmative, operation jumps to step 804. If the determination is negative, operation proceeds to step 803.

In step 803, the ECU 51 stops current supply to the water temperature sensor 41 and sets the current supply stop flag XFTC1 to "1". Subsequently, in step 804, the ECU 51 determines whether a predetermined time Tm1 has elapsed following the stop of current supply executed in step 803. If the determination is affirmative, the ECU 51 proceeds to step 805. If the determination is negative, the ECU 51 temporarily ends this routine.

In step 805, the ECU 51 restarts current supply after the stop in step 302, and sets the current supply restart flag XFTC2 to "1". Subsequently, ECU 51 proceeds to step 806.

In step 806, the ECU 51 determines whether a predetermined time Tm2 has elapsed following the restart of current supply executed in step 805. If the determination is affirmative, the ECU 51 proceeds to step 807. If the determination is negative, the ECU 51 temporarily ends this routine.

In step 807, the ECU 51 determines whether the actually detected water temperature THW read in during the present execution of the main routine is less than a value obtained by subtracting a predetermined value δ2 from the actually detected water temperature THW2 provided when the current supply was stopped in step 805. If the determination is affirmative, operation proceeds to step 808, where the ECU 51 determines that the water temperature sensor 41 has an abnormality. After that, the ECU 51 temporarily ends this routine.

Conversely, if the determination in step 807 is negative, operation proceeds to step 809, where the ECU 51 determines that the thermostat 16 has an abnormality. Then, the ECU 51 temporarily ends this routine.

If it is determined that the water temperature sensor 41 or the thermostat 16 has an abnormality in step 808 or 809 in the sub-routine and, therefore, operation returns to the main routine, the ECU 51 temporarily ends the execution of the main routine, and then inhibits a further interrupt execution of the main routine until the next time the engine 1 is started.

In addition to the detection of an abnormality related to the cooling water temperature adjusting function of the cooling system through the cooling system abnormality detecting routine described in conjunction with the sixth embodiment, the ECU 51 also determines which one of the thermostat 16 and the water temperature sensor 41 has an abnormality if an abnormality is detected in the cooling system, through the thermostat/water temperature sensor abnormality determining routine (sub-routine). When it is determined in the main routine that either the thermostat 16 or the water temperature sensor 41 has an abnormality but it is not determined which one of them is abnormal, the ECU 51 makes a determination in accordance with the following logical process, which may be apparent from the foregoing description of the sub-routine.

First, the supply of current to the water temperature sensor 41 is temporarily stopped and, after the predetermined time Tm1, the current supply is restarted (steps 803–805). After the restart of the current supply, the elapse of the predetermined time Tm2 is waited. If the actually detected water temperature THW remains below the predetermined value (THWt2−δ2) even after the elapse of the predetermined time Tm2, it is determined that the water temperature sensor 41 has an abnormality. If the actually detected water temperature THW increases to or above the predetermined value (THWt2−δ2) before the elapse of the predetermined time Tm2, it is determined that the water temperature sensor 41 does not have an abnormality but the thermostat 16 has an abnormality.

Figure 27:
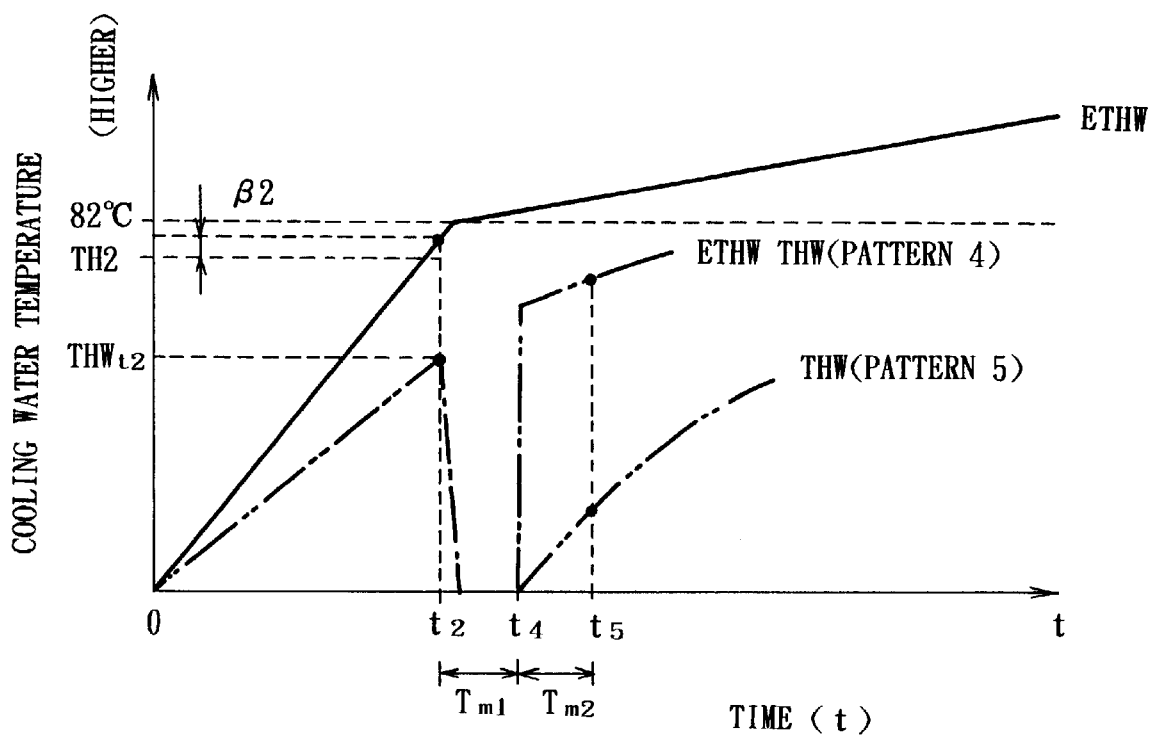
FIG. 27 is a time chart indicating a manner of change in the cooling water temperature after the engine is started.

FIG. 27 shows a time chart similar to the time chart of FIG. 24 described in conjunction with the sixth embodiment. The time chart of FIG. 27 indicates, as an example, the manner of change exhibited by the actually detected water temperature THW after time t2.

As shown in FIG. 27, the first time program operation proceeds to the sub-routine (time point t2), the ECU 51 stops the current supply to the water temperature sensor 41. The current supply is restarted at the elapse of the predetermined time Tm1, i.e., at time point t4. If the water temperature sensor 41 does not have an abnormality, the actually detected water temperature THW quickly returns to a value close to the value occurring at time point t2, as indicated by pattern 4 in FIG. 27. It has been confirmed that if the water temperature sensor 41 has an abnormality, the recovery of the apparent actually detected water temperature THW is delayed after the restart of the current supply at time point t4, as indicated by the change of manner of pattern 5.

Considering this characteristic, the ECU 51 waits for the elapse of the predetermined time Tm2 following the restart of the current supply to the water temperature sensor 41, and then compares the actually detected water temperature THW provided at time point t5 with the actually detected water temperature THWt2 provided at time point t2, in order to determine whether the operation of the water temperature sensor 41 is normal or abnormal.

As in the foregoing embodiments, the seventh embodiment is able to precisely and promptly detect an abnormality if the operation of the cooling system 2 becomes abnormal. The seventh embodiment also precisely determines which one of the thermostat 16 and the water temperature sensor 41 has an abnormality.

An eight embodiment of the invention will now be described below, mainly focusing on the features that distinguish the eighth embodiment from the sixth and seventh embodiments.

An abnormality detector apparatus for a cooling system according to the eighth embodiment is applicable to an automotive engine cooling system, as in the foregoing embodiments. The processes related to the abnormality detection include a cooling system abnormality detecting routine (main routine) wherein an operational abnormality in the cooling system is detected on the basis of various engine operating condition parameters after the engine is started, and a thermostat/water temperature sensor abnormality determining routine (sub-routine) wherein after it is determined in the main routine that either the thermostat 16 or the water temperature sensor 41 has an abnormality, it is determined which one of them is abnormal. The apparatus of the eighth embodiment is different from the sixth and seventh embodiments in the content of the cooling system abnormality detecting routine.

Figure 28:
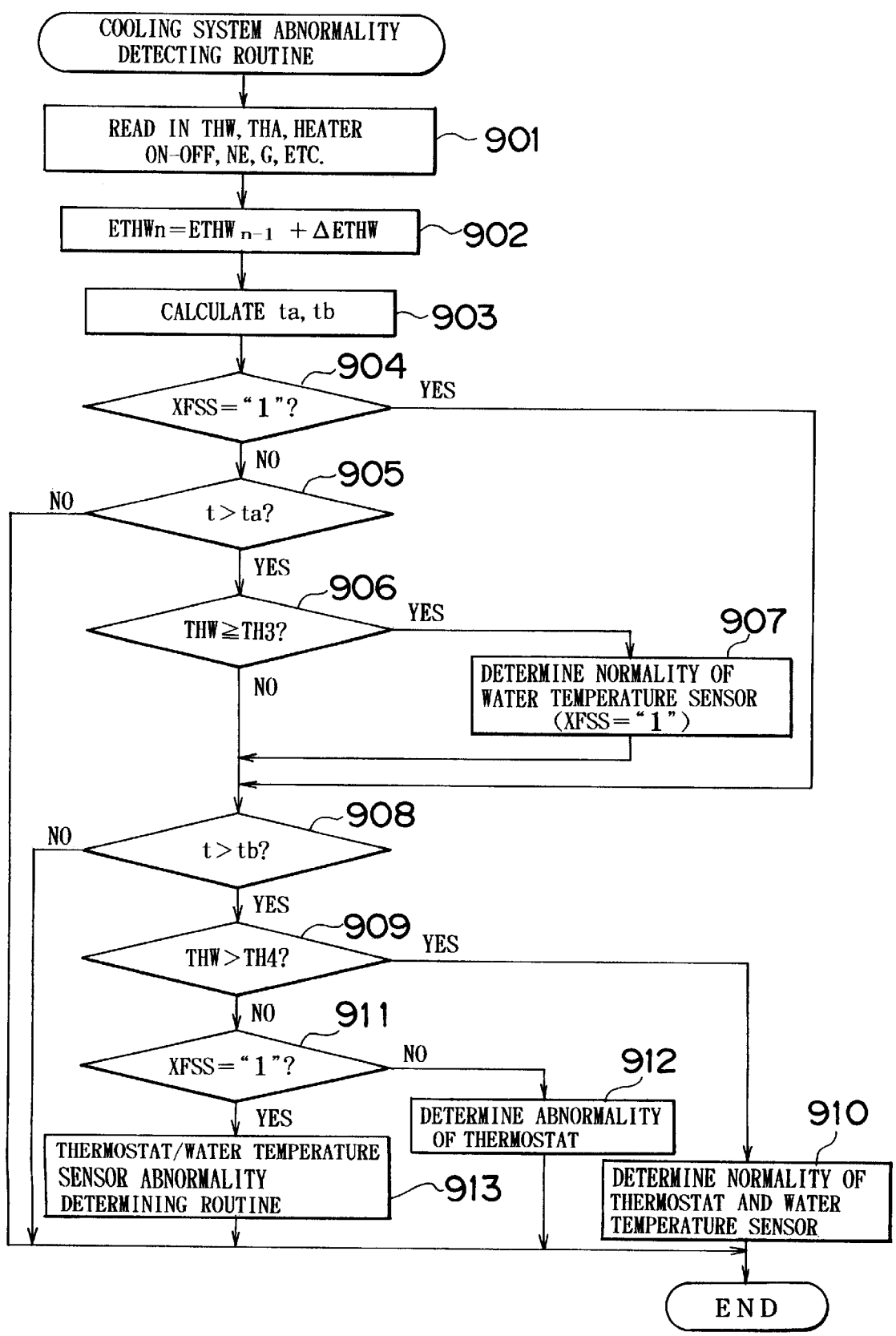
FIG. 28 is a flowchart illustrating a cooling system abnormality detecting procedure according to an eighth embodiment.

FIG. 28 illustrates the cooling system abnormality detecting routine related to the cooling system abnormality detection in this embodiment. When the main electric power source of the motor vehicle is turned on, the routine is executed every predetermined period of time.

When this routine is started, the ECU 51 executes steps 901, 902. The contents of steps 901, 902 are substantially the same as those of steps 601, 602 in the cooling system abnormality detecting routine in the sixth embodiment, and will be described only briefly.

In step 901, the ECU 51 reads in the various operating condition parameters such as the actually detected water temperature THW, the intake air amount THA and the like. In step 902, the ECU 51 calculates an estimated cooling water temperature ETHW on the assumption that both the thermostat 16 and the water temperature sensor 41 are operating normally.

Subsequently in step 903, the ECU 51 sets predetermined time points ta, tb (tb is later than ta). The time point ta is a time point at which the manner of temperature increase significantly differs between a case where the operation of the water temperature sensor 41 is normal and a case where the water temperature sensor 41 is abnormal. The time point ta is calculated on the basis of the various operating condition parameters, with reference to a map (not shown). The time point tb is a suitably selected time point at which it is considered that the cooling water temperature would be monotonously increasing and the valve opening temperature (82° C. in this embodiment) of the thermostat 16 would not be reached yet after the engine is started.

Subsequently in step 904, the ECU 51 determines whether a sensor normality determination flag XFSS described later is "1". If the determination is affirmative, operation jumps to step 908. If the determination is negative, operation proceeds to step 905.

In step 905, the ECU 51 determines whether the predetermined time point ta set in step 903 has been passed. If the determination is affirmative, operation proceeds to step 906. If the determination is negative, the ECU 51 temporarily ends this routine.

In step 906, the ECU 51 determines whether the present read-in actually detected water temperature THW is equal to or greater than a prescribed value TH3. If the determination is negative, operation proceeds to step 908. If the determination is negative, operation proceeds to step 907. In step 907, the ECU 51 determines that the operating condition of the water temperature sensor 41 is normal, and then sets the sensor normality determination flag XFSS to "1". Subsequently, the ECU 51 proceeds to step 908.

In step 908, the ECU 51 determines whether the present time t is after the predetermined time point tb set in step 903, i.e., whether the time point b has been passed. If the determination is affirmative, operation proceeds to step 909. If the determination is negative, the ECU 51 temporarily ends this routine.

In step 909, the ECU 51 determines whether the presently read-in actually detected water temperature THW is higher than a prescribed value TH4. If the determination is affirmative, operation proceeds to step 910. In step 910, the ECU 51 determines that both the thermostat 16 and the water temperature sensor 41 are normal. Subsequently, the ECU 51 temporarily ends the present execution of the routine.

Conversely, if the determination in step 909 negative, operation proceeds to step 911. In step 911, the ECU 51 determines whether the sensor normality determination flag XFSS, described or indicated above in conjunction with step 907, is presently "1". If the determination is affirmative, operation proceeds to step 912, where the ECU 51 determines that the thermostat 16 has an abnormality. Subsequently, the ECU 51 ends the present execution of the routine.

Conversely, if the determination in step 911 is negative, the ECU 51 determines that either the thermostat 16 or the water temperature sensor 41 has an abnormality, and proceeds to step 913, that is, the thermostat/water temperature sensor abnormality determining routine (that is, the subroutine of the cooling system abnormality detecting routine). The content of the sub-routine, that is, step 913, may be the same as that of either one of the thermostat/water temperature sensor abnormality determining routines in the sixth and seven the embodiments (FIGS. 22 and 26).

In short, in the eighth embodiment, the ECU 51 executes the cooling system abnormality detecting routine (main routine) as described above, and the thermostat/water temperature sensor abnormality determining routine (subroutine) as described in conjunction with the sixth or seventh embodiment. As is apparent from the foregoing description, the main routine of this embodiment is designed so that an abnormality related to the cooling system 2 is detected by comparing the actually detected water temperature THW with the estimated cooling water temperature ETHW at the elapse of the first and second predetermined periods of time after the engine is started.

As in the sixth and seventh embodiments, the eighth embodiment, having the design as described above, is able to detect an abnormality related to the cooling water temperature adjusting function of the cooling system. Furthermore, if there is an abnormality in the cooling system, the apparatus of the embodiment quickly and precisely determines which one of the thermostat 16 and the water temperature sensor 41 has an abnormality.

Although in the eighth embodiment, the main routine is designed so that the detection time point ta related to the cooling system abnormality detection or the determination time point tb related to the thermostat/water temperature sensor abnormality determination is adjusted in accordance with the engine operating condition after a start of the engine, it is also possible to set and fix the time points ta, tb based solely on the operating condition at the start of the engine. This design will reduce the operating load on the ECU 51 during the main routine.

In the sixth to eighth embodiments, the estimated cooling water temperature ETHW is calculated on the basis of the various engine operating condition parameters, such as the cooling water temperature at the time of a start of the engine 1, the intake temperature, the engine revolution speed, the intake air amount and the like. The selection or combination of the various parameters to be used and the manner of the operation or calculation based on the parameters or the design of the data map to be employed may vary according to the sixth to eighth embodiments. It may be essential only to calculate the estimated cooling water temperature ETHW basically in accordance with the heat balance of the cooling water, by adding a factor concerned with the engine operation after start and an external environment factor to the initial value of the actually detected cooling water temperature.

The constants, such as $\alpha 2$, $\beta 2$ and the like, which are used in the routines in the sixth to eighth embodiments, provide allowable ranges in determining whether the estimated cooling water temperature and the actually detected cooling water temperature are approximate to each other in order to determine whether there is an abnormality in the cooling apparatus. Although in the foregoing embodiments, the values, such as $\alpha 2$, $\beta 2$ and the like, are set as constants beforehand, it is also possible to adopt a logical process wherein the ECU 51 sets, as $\alpha 2$, $\beta 2$ or the like, a suitable value in accordance with the engine-start cooling water temperature or other engine operating conditions. Such a logic design will possibly achieve more reliable abnormality detection in accordance with not only the engine characteristics but also external environment conditions.

In this patent application, the devices, concepts or the like related to the construction of the invention are defined as follows.

The "engine" means a wide variety of driving apparatuses, including internal combustion engines, external combustion engines, electric motors, and the like.

The "thermostat abnormality detector apparatus" include not only apparatuses for detecting an abnormality in a thermostat but various apparatuses capable of detecting or determining an operating condition related to the presence or absence of an abnormality.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements.

What is claimed is:

1. An abnormality detector apparatus for a cooling apparatus provided in a coolant circulation passage of an engine, comprising:

a coolant temperature detector that detects a coolant temperature in the engine;

a setter that sets, after the engine is started, a coolant temperature criterion set by the setter and an abnormality condition where an abnormality appears in the coolant temperature; and an electronic control unit that compares the coolant temperature, detected by the coolant temperature detector, with the coolant temperature criterion, when the electronic control unit determines that an operating condition of the engine has become the abnormality condition, wherein if the coolant temperature is lower than the coolant temperature criterion, the electronic control unit determines that the cooling apparatus has an abnormality.

2. An abnormality detector apparatus according to claim 1, further comprising:

an operating condition parameter detector that detects an operating condition parameter of the engine, wherein the electronic control unit determines that the operating condition of the engine has become the abnormality condition if the operating condition parameter detected by the operating condition parameter detector, exceeds a predetermined reference value.

3. An abnormality detector apparatus according to claim 2, wherein the coolant temperature criterion is an estimated coolant water temperature calculated on the basis of an operating condition of the engine.

4. An abnormality detector apparatus according to claim 3, wherein the coolant temperature criterion is set to a value equal to or less than a predetermined coolant temperature value at which the cooling apparatus opens the coolant circulation passage.

5. An abnormality detector apparatus according to claim 4, wherein the operating condition parameter of the engine is calculated on the basis of at least one factor related to heat generation or heat dissipation of the engine.

6. An abnormality detector apparatus according to claim 3, wherein the operating condition parameter of the engine is calculated on the basis of at least one factor related to heat generation or heat dissipation of the engine.

7. An abnormality detector apparatus according to claim 2, wherein the coolant temperature criterion is set to a value equal to or less than a predetermined coolant temperature value at which the cooling apparatus opens the coolant circulation passage.

8. An abnormality detector apparatus according to claim 7, wherein the operating condition parameter of the engine is calculated on the basis of at least one factor related to heat generation or heat dissipation of the engine.

9. An abnormality detector apparatus according to claim 2, wherein the operating condition parameter of the engine is calculated on the basis of at least one factor related to heat generation or heat dissipation of the engine.

10. An abnormality detector apparatus according to claim 1, wherein the coolant temperature criterion is an estimated coolant temperature calculated on the basis of an operating condition of the engine.

11. An abnormality detector apparatus according to claim 10, wherein the coolant temperature criterion is set to a value equal to or less than a predetermined coolant temperature value at which the cooling apparatus opens the coolant circulation passage.

12. A abnormality detector apparatus according to claim 1, wherein the coolant temperature criterion is set to a value equal to or less than a predetermined coolant temperature value at which the cooling apparatus opens the coolant circulation passage.

13. A thermostat abnormality detector apparatus for a thermostat provided in a cooling water circulation passage of an engine, wherein the thermostat closes the cooling water circulation passage if a cooling water temperature is lower than a coolant temperature criterion and opens the cooling water circulation passage if the cooling water temperature is equal to or higher than a coolant temperature criterion, the apparatus comprising:

a cooling water temperature detector that detects the cooling water temperature in the engine;

abnormality determination means for determining that there is an abnormality in the operation of the thermostat when the cooling water temperature detected by the cooling water temperature detection means is lower than a predetermined reference water temperature after an elapse of a predetermined time following a start of the engine;

normality determination means for determining that the operation of the thermostat is normal, if the detected cooling water temperature is equal to or higher than the predetermined reference water temperature after the elapse of a predetermined time following the start of the engine;

first cooling temperature estimating means for estimating a cooling water temperature under a condition where abnormal operation of the thermostat is assumed;

second cooling temperature estimating means for estimating a cooling water temperature under a condition where a normal operation of the thermostat is assumed;

normality determination permitting means for permitting the normality determination means to operate, if the cooling water temperature estimated by the first cooling water temperature estimating means is lower than a predetermined water temperature;

abnormality determination permitting means for permitting the abnormality determination means to operate, if the cooling water temperature estimated by the second cooling water temperature estimating means is equal to or higher than the predetermined water temperature.

14. A thermostat abnormality detector apparatus according to claim 13, wherein, if the cooling water temperature estimated by the second cooling water temperature estimating means is lower than the predetermined water temperature when a predetermined time following the start of the engine has elapsed, the operation of the abnormality determination means and the operation of the normality determination means are withheld.

15. A thermostat abnormality detector apparatus according to claim 14, wherein, if the cooling water temperature estimated by the first cooling water temperature estimating means becomes equal to or higher than the predetermined water temperature before the detected cooling water temperature reaches the predetermined reference water temperature, an operation of the abnormality determination means and an operation of the normality determination means are withheld.

16. A thermostat abnormality detector apparatus according to claim 14, wherein, if the cooling water temperature estimated by the first cooling water temperature estimating means becomes equal to or higher than the predetermined water temperature when a predetermined time following the start of the engine has elapsed, an operation of the abnormality determination means and an operation of the normality determination means are withheld.

17. A thermostat abnormality detector apparatus according to claim 13, wherein, if the cooling water temperature estimated by the first cooling water temperature estimating means becomes equal to or higher than the predetermined water temperature before the detected cooling water temperature reaches the predetermined reference water temperature, an operation of the abnormality determination means and an operation of the normality determination means are withheld.

18. A thermostat abnormality detector apparatus according to claim 13, wherein, if the cooling water temperature estimated by the first cooling water temperature estimating means becomes equal to or higher than the predetermined water temperature when a predetermined time following the start of the engine has elapsed, an operation of the abnormality determination means and an operation of the normality determination means are withheld.

19. A cooling apparatus abnormality detector for a cooling apparatus having a thermostat provided in a cooling water circulation passage of an engine, and a cooling water temperature detector that detects a cooling water temperature in the engine, the abnormality detector comprising:
an abnormality detector that detects an abnormality in the cooling apparatus based on a change in the cooling water temperature after the engine is started; and
determination means for determining which one of the thermostat and the cooling water temperature detector has an abnormality, based on a change in the cooling water temperature occurring after the abnormality is detected in the cooling apparatus.

20. A cooling apparatus abnormality detector according to claim 19, wherein the determination means determines that the thermostat has an abnormality if a rate related to an increase of the cooling water temperature, detected by the cooling water temperature detector, is equal to or greater than a predetermined reference rate after an abnormality is detected in the cooling apparatus, and wherein if the rate is less than the predetermined reference rate, the detector determines that the cooling water temperature detection means has an abnormality.

21. A cooling apparatus abnormality detector according to claim 20,
wherein the abnormality detector includes cooling water temperature estimating means for calculating an estimated cooling water temperature based on an operating condition of the engine, on an assumption that the operation of the thermostat is normal, and
wherein, if a difference between a rate of increase of the detected cooling water temperature and a rate of increase of the estimated cooling water temperature is equal to or greater than a predetermined rate, the abnormality detector determines that there is an abnormality in the cooling apparatus.

22. A cooling apparatus abnormality detector according to claim 21, further comprising a water temperature detecting function abnormality detector that determines that the cooling water temperature detector has an abnormality if an amount of change in a detected cooling water temperature for a predetermined time interval is equal to or greater than a predetermined amount.

23. A cooling apparatus abnormality detector according to claim 20, further comprising a water temperature detecting function abnormality detector that determines that the cooling water temperature detector has an abnormality if an amount of change in a detected cooling water temperature for a predetermined time interval is equal to or greater than a predetermined amount.

24. A cooling apparatus abnormality detector according to claim 19, wherein, if the detected cooling water temperature is less than a predetermined reference water temperature after an elapse of a predetermined time following a start of the engine, the abnormality detector determines that the cooling apparatus has an abnormality.

25. A cooling apparatus abnormality detector according to claim 24, further comprising a water temperature detecting function abnormality detector that determines that the cooling water temperature detector has an abnormality if an amount of change in a detected cooling water temperature for a predetermined time interval is equal to or greater than a predetermined amount.

26. A cooling apparatus abnormality detector according to claim 19, wherein after an abnormality is detected in the cooling apparatus, the determination means temporarily stops an operation of the cooling water temperature detector and then restarts the operation of the cooling water temperature detector, and wherein, if the cooling water temperature after the operation of the cooling water temperature detector is restarted, is equal to or higher than a predetermined value, the determination means determines that the cooling water temperature detector is operating normally.

27. A cooling apparatus abnormality detector according to claim 26, wherein the abnormality detector includes cooling water temperature estimating means for calculating an estimated cooling water temperature based on an operating condition of the engine, on an assumption that the operation of the thermostat is normal, and
wherein, if a difference between a rate of increase of the detected cooling water temperature and a rate of increase of the estimated cooling water temperature is equal to or greater than a predetermined rate, the abnormality detector determines that there is an abnormality in the cooling apparatus.

28. A cooling apparatus abnormality detector according to claim 27, further comprising a water temperature detecting function abnormality detector that determines that the cooling water temperature detector has an abnormality if an amount of change in a detected cooling water temperature for a predetermined time interval is equal to or greater than a predetermined amount.

29. A cooling apparatus abnormality detector according to claim 26, wherein, if the detected cooling water temperature is less than a predetermined reference water temperature after an elapse of a predetermined time following a start of the engine, the abnormality detector determines that the cooling apparatus has an abnormality.

30. A cooling apparatus abnormality detector according to claim 29, further comprising a water temperature detecting function abnormality detector that determines that the cooling water temperature detector has an abnormality if an amount of change in a detected cooling water temperature for a predetermined time interval is equal to or greater than a predetermined amount.

31. A cooling apparatus abnormality detector according to claim 26, further comprising a water temperature detecting function abnormality detector that determines that the cooling water temperature detection means has an abnormality if an amount of change in a detected cooling water temperature for a predetermined time interval is equal to or greater than a predetermined amount.

32. A cooling apparatus abnormality detector according to claim 19, wherein the abnormality detection means includes cooling water temperature estimating means for calculating an estimated cooling water temperature based on an operating condition of the engine, on an assumption that the operation of the thermostat is normal, and wherein, if a difference between a rate of increase of the detected cooling water temperature and a rate of increase of the estimated cooling water temperature is equal to or greater than a predetermined rate, the abnormality detector determines that there is an abnormality in the cooling apparatus.

33. A cooling apparatus abnormality detector according to claim 32, further comprising a water temperature detecting function abnormality detector that determines that the cooling water temperature detector has an abnormality if an amount of change in a detected cooling water temperature for a predetermined time interval is equal to or greater than a predetermined amount.

34. A cooling apparatus abnormality detector according to claim 19, wherein, if the detected cooling water temperature is less than a predetermined reference water temperature after an elapse of a predetermined time following a start of the engine, the abnormality detector determines that the cooling apparatus has an abnormality.

35. A cooling apparatus abnormality detector according to claim 34, further comprising a water temperature detecting function abnormality detector that determines that the cooling water temperature detector has an abnormality if an amount of change in a detected cooling water temperature for a predetermined time interval is equal to or greater than a predetermined amount.

36. A cooling apparatus abnormality detector according to claim 19, further comprising a water temperature detecting function abnormality detector that determines that the cooling water temperature detector has an abnormality if an amount of change in a detected cooling water temperature for a predetermined time interval is equal to or greater than a predetermined amount.

37. An abnormality detection method for a cooling apparatus provided in a coolant circulation passage of an engine, comprising:

detecting a coolant temperature in the engine;

setting, after the engine is started, a coolant temperature criterion and an abnormality condition where an abnormality appears in the coolant temperature;

comparing the coolant temperature with the coolant temperature criterion, if an operating condition of the engine becomes the abnormality condition; and determining that the cooling apparatus has an abnormality when the coolant temperature is lower than the coolant temperature criterion.

38. The detection method according to claim 37, further comprising:

detecting an operating condition parameter of the engine; and determining that the operating condition of the engine has become the abnormality condition if the operating condition parameter exceeds a predetermined reference value.

39. The detection method according to claim 38, wherein the operating condition parameter of the engine is determined based on at least one factor related to either heat generation or heat dissipation of the engine.

40. The detection method according to claim 38, wherein the coolant temperature criterion is set to a value equal to or less than a predetermined coolant temperature value at which the cooling apparatus opens the coolant circulation passage.

41. The detection method according to claim 40, wherein the operating condition parameter of the engine is determined based on at least one factor related to either heat generation or heat dissipation of the engine.

42. The detection method according to claim 38, wherein the coolant temperature criterion is an estimated coolant water temperature calculated based on the operating condition of the engine.

43. The detection method according to claim 42, wherein the operating condition parameter of the engine is determined based on at least one factor related to either heat generation or heat dissipation of the engine.

44. The detection method according to claim 42, wherein the coolant temperature criterion is set to a value equal to or less than a predetermined coolant temperature value at which the cooling apparatus opens the coolant circulation passage.

45. The detection method according to claim 44, wherein the operating condition parameter of the engine is determined based on at least one factor related to either heat generation or heat dissipation of the engine.

46. The detection method according to claim 37, wherein the coolant temperature criterion is an estimated coolant water temperature calculated based on the operating condition of the engine.

47. The detection method according to claim 46, wherein the coolant temperature criterion is set to a value equal to or less than a predetermined coolant temperature value at which the cooling apparatus opens the coolant circulation passage.

48. The detection method according to claim 37, wherein the coolant temperature criterion is set to a value equal to or less than a predetermined coolant temperature value at which the cooling apparatus opens the coolant circulation passage.

* * * * *